(12) United States Patent
Huang et al.

(10) Patent No.: US 6,922,500 B2
(45) Date of Patent: Jul. 26, 2005

(54) OPTICAL CONFIGURATION FOR OPTICAL FIBER SWITCH

(75) Inventors: Cheng-Chung Huang, Sunnyvale, CA (US); Steven Saeed Nasiri, Saratoga, CA (US); Randall Brian Sprague, Carnation, WA (US); Alex Harwit, San Mateo, CA (US); Dmitry Vasily Bakin, San Jose, CA (US); Janusz Bryzek, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 09/999,878

(22) Filed: Oct. 24, 2001

(65) Prior Publication Data

US 2003/0206685 A1 Nov. 6, 2003

(51) Int. Cl.[7] ................................................ G02B 6/35
(52) U.S. Cl. ............................. 385/18; 385/24; 385/47
(58) Field of Search ............................ 385/16–24, 31, 385/33–36, 47

(56) References Cited

U.S. PATENT DOCUMENTS

| | | | |
|---|---|---|---|
| 4,319,839 A | 3/1982 | Durran |
| 4,996,412 A | 2/1991 | Anafi et al. |
| 5,177,348 A | 1/1993 | Laor |
| 5,309,537 A | 5/1994 | Chun et al. |
| 5,319,509 A | 6/1994 | Michelson et al. |
| 5,647,033 A | 7/1997 | Laughlin |
| 5,864,643 A | 1/1999 | Pan |
| 5,960,132 A | 9/1999 | Lin |
| 6,130,984 A | 10/2000 | Shen et al. |
| 6,154,433 A | 11/2000 | Hoshino et al. |
| 6,181,864 B1 | 1/2001 | Jang et al. |
| 6,222,954 B1 | 4/2001 | Riza |
| 6,229,640 B1 | 5/2001 | Zhang |
| 6,289,145 B1 | 9/2001 | Solgaard et al. |

(Continued)

FOREIGN PATENT DOCUMENTS

| | | |
|---|---|---|
| WO | WO 01/24384 A2 | 4/2001 |
| WO | WO 01/53875 A1 | 7/2001 |
| WO | PCT/US 02/33925 | 4/2003 |

OTHER PUBLICATIONS

Bishop, David et al., "Micromirrors Relieve Communications Bottlenecks," *Photonics Spectra*, Mar. 2000, pp. 167–169.

Bishop, David J. et al., "The Rise of Optical Switching," *Scientific American*, Jan. 2001, pp. 74–79.

Neilson, D.T. et al., " Fully Provisioned 112x112 Micro–Mechanical Optical Crossconnect With 35.8Tb/s Demonstrated Capacity," Optical Fiber Communication Conference, Technical Digest Postconference Edition, Trends in Optics and Photonics vol. 37, pp. 202–204, 2000, Washington, D.C., USA.

*Primary Examiner*—Michelle R. Connelly-Cushwa
(74) *Attorney, Agent, or Firm*—Blakely, Sokoloff, Taylor & Zafman LLP

(57) ABSTRACT

An optical fiber switch in accordance with an embodiment of the present invention includes a first plurality of ports, a second plurality of ports, a first plurality of mirrors disposed on a first surface, and a second plurality of mirrors disposed on a second surface. Each one of the first plurality of mirrors is individually controllable to direct light output from a corresponding one of the first plurality of ports to any one of the second plurality of mirrors. Each one of the second plurality of mirrors is individually controllable to direct to a corresponding one of the second plurality of ports light incident on it from any one of the first plurality of mirrors. Advantageously, optical fiber switches in accordance with embodiments of the present invention may couple more than a thousand input ports to more than a thousand output ports with an insertion loss of less than about 3 decibels.

36 Claims, 15 Drawing Sheets

U.S. PATENT DOCUMENTS

| | | |
|---|---|---|
| 6,295,400 B1 | 9/2001 | Shahid |
| 6,320,993 B1 | 11/2001 | Laor |
| 6,327,398 B1 | 12/2001 | Solgaard et al. |
| 6,363,183 B1 | 3/2002 | Koh |
| 6,374,032 B1 | 4/2002 | Mao et al. |
| 6,411,751 B1 | 6/2002 | Giles et al. |
| 6,427,038 B1 | 7/2002 | Britz et al. |
| 6,456,751 B1 | 9/2002 | Bowers et al. |
| 6,470,110 B1 * | 10/2002 | Lin ............... 385/18 |
| 6,470,123 B1 | 10/2002 | Sherman et al. |
| 6,480,320 B2 | 11/2002 | Nasiri |
| 6,483,962 B1 | 11/2002 | Novotny |
| 6,549,692 B1 * | 4/2003 | Harel et al. ............ 385/18 |
| 6,567,574 B1 * | 5/2003 | Ma et al. ............. 385/16 |
| 6,587,611 B1 | 7/2003 | Hunt |
| 6,614,954 B2 | 9/2003 | Huang et al. |
| 6,616,974 B1 | 9/2003 | Lorig et al. |
| 6,631,222 B1 | 10/2003 | Wagener et al. |
| 6,632,374 B1 * | 10/2003 | Rosa et al. ............ 216/24 |
| 6,636,656 B2 | 10/2003 | Huang et al. |
| 6,690,849 B1 * | 2/2004 | Dadap et al. ........... 385/18 |
| 6,690,885 B1 * | 2/2004 | Aksyuk et al. .......... 398/45 |
| 2002/0114566 A1 | 8/2002 | Fairchild et al. |
| 2002/0131682 A1 | 9/2002 | Nasiri et al. |
| 2002/0186918 A1 | 12/2002 | Burroughs |
| 2002/0191901 A1 | 12/2002 | Jensen |
| 2003/0007148 A1 | 1/2003 | Moon et al. |
| 2003/0012509 A1 | 1/2003 | Chang et al. |
| 2003/0026582 A1 | 2/2003 | In't Hout et al. |
| 2003/0068117 A1 * | 4/2003 | Syms ............... 385/18 |
| 2004/0169909 A1 * | 9/2004 | Miller .............. 359/290 |

* cited by examiner

OPTICAL CONFIGURATION FOR OPTICAL FIBER SWITCH

CROSS REFERENCE TO RELATED APPLICATIONS

This application is related to the following, commonly assigned, U.S. patent applications: U.S. patent application Ser. No. 9/999,610, U.S. patent application Ser. No. 09/999,705, U.S. patent application Ser. No. 09/866,063, U.S. patent application Ser. No. 10/003,659, issued as U.S. Pat. No. 6,614,954, U.S. patent application Ser. No. 10/002,310, issued as U.S. Pat. No. 6,636,656, all of which are incorporated herein by reference. This application is also related to U.S. patent application Ser. No. 09/779,189, now U.S. Pat. No. 6,480,320 entitled "A Microelectromechanical Mirror," filed Feb. 7, 2001, assigned to the assignee of the present invention, and incorporated herein by reference.

BACKGROUND OF THE INVENTION

1. Field of the Invention

The present invention relates to optical fiber cross-connect switching.

2. Description of the Related Art

As optical fiber progressively supplements and replaces metal wire as the backbone of telecommunications networks, the switches that route optical signals have emerged as a significant bottleneck. Transmission systems move information as optical photons but the switching systems and so-called cross-connect fabrics that switch, route, multiplex, and demultiplex optical signals have generally been electronic. Electronic switching requires light to be converted to an electronic signal to pass through the switch and then be reconverted to light in a process termed optical-electronic-optical (OEO) conversion that introduces both time delay and cost.

There is great interest in the telecommunications industry, therefore, in developing all optical switching to avoid the necessity of multiple OEO conversions. As described, for example, by Bishop et al. in Scientific American (January, 2001, pp. 88–94), all optical switches based on a number of underlying technologies including Micro Electro Mechanical Systems (MEMS) tilting mirrors, thermo-optical devices, bubbles formed by inkjet printing heads, and liquid crystals, have been proposed. Optical fiber switches based on MEMS mirrors are particularly attractive because they can incorporate very large scale integrated circuits and can be robust, long-lived, and scalable.

An optical fiber switch described in U.S. Pat. No. 5,960,132 to Lin, for example, includes an array of hinged MEMS mirrors, each of which can be rotated about its hinge between a reflective state and a non-reflective state. An array of $N^2$ such mirrors is required to switch signals carried by N input optical fibers from one to another of N output optical fibers. Unfortunately, $N^2$ scaling results in unmanageably complex devices for large N.

Another optical fiber switch described in Bishop et al., cited above, as well as in Bishop et al., Photonics Spectra (March 2000, pp. 167–169) includes an array of MEMS mirrors disposed on a single surface. Each mirror tilts independently to direct light received from an array of input/output optical fibers to any other mirror and thus to any input/output fiber. This optical fiber switch does not appear to include optical diagnostics which would enable active closed-loop optical feedback control of the mirror orientations or allow input presence detection.

Optical fiber switches having a low insertion loss and capable of cross-connecting large numbers of input and output fibers would further the development of fiber optic telecommunications networks.

SUMMARY

An optical fiber switch in accordance with the present invention includes a first plurality of ports, a second plurality of ports, a first plurality of mirrors disposed on a first surface, and a second plurality of mirrors disposed on a second surface. Each one of the first plurality of mirrors is individually controllable to direct light output from a corresponding one of the first plurality of ports to any one of the second plurality of mirrors. Each one of the second plurality of mirrors is individually controllable to direct to a corresponding one of the second plurality of ports light incident on it from any one of the first plurality of mirrors.

The first and second plurality of mirrors may each include greater than about 1000 mirrors. These mirrors may be controllable with an angular resolution greater than about 0.005°. The first and second plurality of ports may each include greater than about 1000 ports.

In one embodiment, optical paths from the first plurality of mirrors to the second plurality of mirrors are via a dichroic optical element such as, for example, a dichroic beam splitter or a dichroic mirror. Control light beams used to measure and control the orientations of the various mirrors and having wavelengths different from the wavelengths of the (e.g., telecommunication) light carried by the optical fibers may be conveniently passed through the dichroic optical element and directed to the various mirrors or to position sensing detectors, for example.

In another embodiment, a dichroic optical element is located in an optical path between the first plurality of ports and the first plurality of mirrors. Control light beams may also be conveniently passed through this dichroic optical element and directed to, for example, the various mirrors or to position sensing detectors.

In another embodiment, light output by one of the first plurality of ports is incident on one of the first plurality of mirrors at an angle less than about 25° with respect to an axis normal to the first surface. In one implementation, one of the second plurality of mirrors similarly reflects light received from one of the first plurality of mirrors to one of the second plurality of ports at an angle less than about 25° with respect to an axis normal to the second surface. In one implementation, such low angles of incidence and of reflection are facilitated by a fold mirror. In another implementation, such low angles of incidence and of reflection are achieved without a fold mirror.

As a consequence of the low angles of incidence and reflection, the footprints of light beams on the mirrors are nearly circular. This allows the advantageous use of small, nearly circular mirrors which have low inertia and are thus easier to move than larger or substantially non-circular mirrors. In addition, nearly-circular mirrors deform less than substantially non-circular mirrors upon application of a coating, such as a reflective coating.

Another embodiment includes a beam splitter located in an optical path between the first plurality of ports and the first plurality of mirrors. This beam splitter may, for example, direct a portion of light output by one of the first plurality of ports to a detector and thereby provide input signal (e.g. telecommunication light beam) presence and level detection. Similarly, the optical switch may include a beam splitter located in an optical path between the second plurality of mirrors and the second plurality of ports. Such a beam splitter may, for example, direct a portion of light reflected by one of the second plurality of ports (i.e., light directed to but not coupled into the port) to a detector and thereby enable verification of the alignment of the optical switch and detection of faults in output fibers.

In another embodiment, light output by one of the first plurality of ports is focused to a waist between the first plurality of mirrors and the second plurality of mirrors. Such focusing allows use of optical elements (e.g. mirrors) of reduced size without substantially increasing optical loss.

In another embodiment, the first plurality of ports, the second plurality of ports, the first plurality of mirrors, and the second plurality of mirrors are arranged symmetrically. The arrangement may be symmetrical with respect to, for example, a fold mirror. Such symmetrical arrangements allow bi-directional transmission of light through the optical switch, i.e., either the first or the second plurality of ports may be input ports.

Advantageously, optical fiber switches in accordance with embodiments of the present invention can couple greater than a thousand input ports to greater than a thousand output ports with an insertion loss of less than about 3 decibels.

BRIEF DESCRIPTION OF THE DRAWINGS

Like reference numbers in the various figures denote same parts in the various embodiments. Dimensions in the figures are not necessarily to scale.

DETAILED DESCRIPTION

An optical fiber cross-connect switch in accordance with embodiments of the present invention routes light input through any one of N input ports to any one of P output ports. In a typical optical path through a switch, light entering the switch through an input port is incident on a corresponding first micro-mechanical mirror in a first two dimensional array of micro-mechanical mirrors. The first micro-mechanical mirror, which can be oriented in a range of arbitrary directions (d$\theta$,d$\phi$), is tilted to direct the light to a second micro-mechanical mirror in a second two dimensional array of micro-mechanical mirrors. The second micro-mechanical mirror, which can also be oriented in a range of arbitrary directions (d$\theta$,d$\phi$), is tilted to direct the light to a corresponding output port and hence out of the switch.

The light may be switched from the output port to which it is initially directed to another output port by reorienting the first micro-mechanical mirror to direct the light to a third micro-mechanical mirror in the second array of micromirrors, and orienting the third micro-mechanical mirror to direct the light to its corresponding output port. A control system is provided to control the orientations of the micro-mechanical mirrors and thus accomplish the switching. A number of embodiments will be described in which the orientations of the various micro-mechanical mirrors are measured and controlled by reflecting light beams (separate from those being routed through and switched by the optical fiber switch) from the micro-mechanical mirrors and measuring the locations at which the reflected light beams are incident on position sensing detectors.

Although the number of input ports equals the number of output ports (N=P) in the embodiments described below, in other embodiments N<P or N>P.

Figure 1:
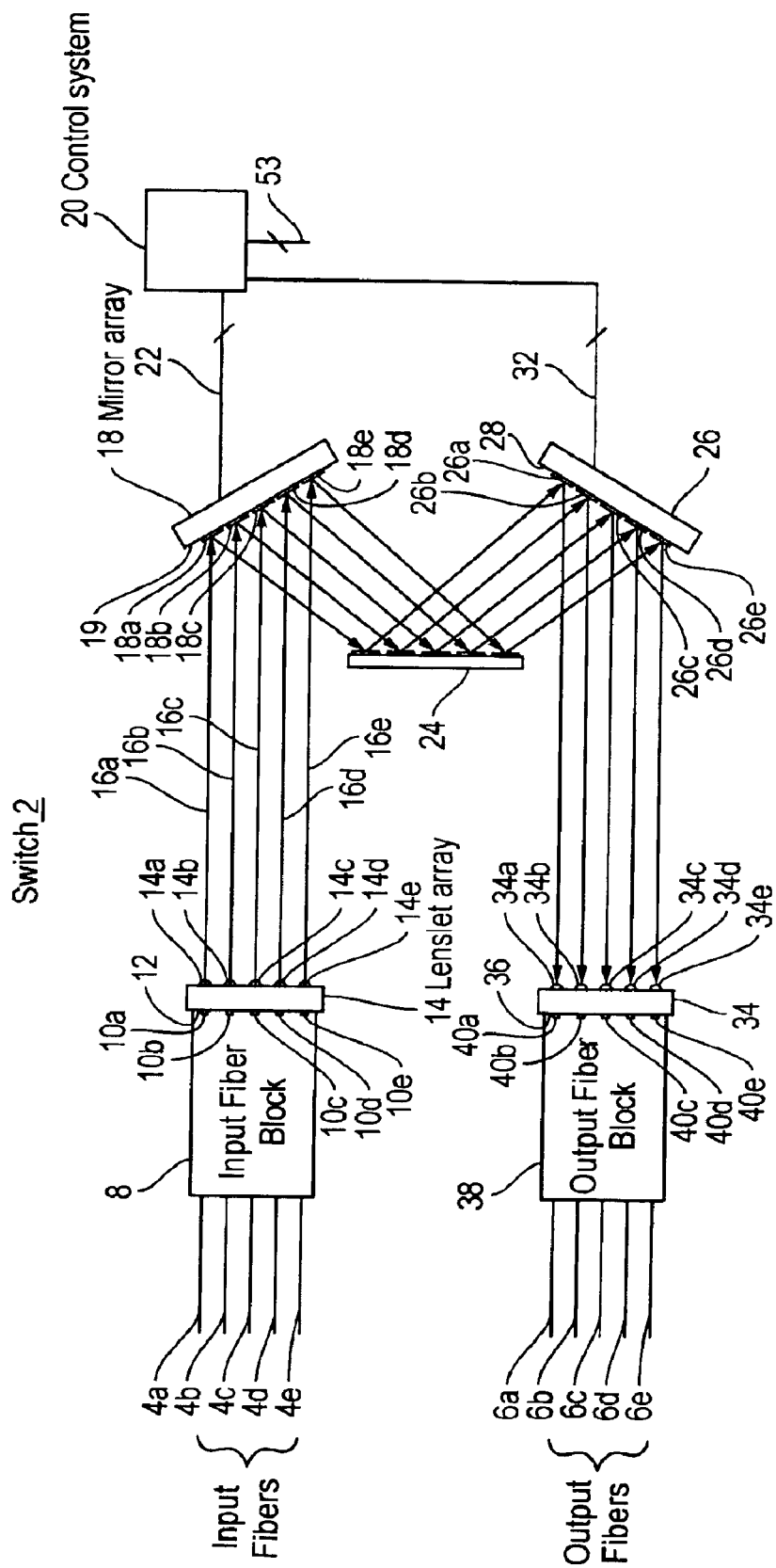
FIG. 1 is a schematic illustration of an optical switch in accordance with an embodiment of the present invention.

For convenience of illustration, an optical fiber cross-connect switch 2 (FIG. 1) in accordance with one embodiment will be described with reference to N=5 input optical fibers 4a–4e serving as input ports, P=N=5 output optical fibers 6a–6e serving as output ports, and N=5 of various other optical elements and light beams located in optical paths between input fibers 4a–4e and output fibers 6a–6e, as shown in FIG. 1. It should be understood, however, that in other embodiments in accordance with the present invention, N and P are both typically greater than about 1000. In one embodiment, for example, N is about 1200 and P=N.

As is conventional in Dense Wavelength Division Multiplexing, each of the input optical fibers may carry light having a plurality of wavelengths. In one implementation, the light carried by the input optical fibers has wavelengths near about 1310 nanometers (nm) or about 1550 nm. The input optical fibers and the output optical fibers are, for example, conventional Corning, Incorporated SMF-28 single mode optical fibers having a core diameter of about 8 microns ($\mu$m) and a cladding diameter of about 125 $\mu$m. Other optical fibers suitable for optical communications applications may also be used.

Referring to FIG. 1, N input optical fibers 4a–4e enter input fiber block 8, which rigidly positions their respective ends 10a–10e in a two dimensional array at surface 12 of block 8. Surface 12 is polished, for example, to a flatness better than about 300 nanometers (nm) to form a planar surface including fiber ends 10a–10e. Input fiber block 8 fixes the positions and orientations of fiber ends 10a–10e with respect to other optical elements in optical switch 2, thereby preventing motion of fiber ends 10a–10e from misaligning switch 2.

In one implementation, input fiber block 8 includes a silicon plate through which pass N substantially parallel holes arranged, for example, in a rectangular array having horizontal and vertical pitches of about 1 millimeter (mm). Into each hole is inserted a corresponding one of input optical fibers 4a–4e. Surface 12 of input fiber block 8 is polished to form a planar surface substantially perpendicular to the input optical fibers and including their ends 10a–10e. At surface 12 the N optical fiber ends form, for example, a rectangular array as described above. For N=1200, for example, the array may be a rectangular 30×40 array. Various implementations of input fiber block 8 are described in greater detail in U.S. patent aplication Ser. No. 09/866,063, incorporated herein by reference.

Light carried by input optical fibers 4a–4e is output as diverging cones of light by, respectively, the cores of fiber ends 10a–10e. The N lenslets (small lenses) 14a–14e of lenslet array 14 collect light output, respectively, by fiber ends 10a–10e and form, respectively, N substantially parallel or weakly focused light beams 16a–16e. Lenslet array 14 is located adjacent to input fiber block 8, with lenslets 14a–14e arranged in a pattern matching that of fiber ends 10a–10e such that lenslets 14a–14e are located with their optical axes approximately centered on, respectively, fiber ends 10a–10e.

In one implementation, lenslets 14a–14e have focal lengths of about 4 mm, diameters of about 1 mm, and are spaced approximately 3 mm from surface 12 of input block 8. Lenslet array 14 is formed, for example, from fused silica, optical glass, silicon, plastic, or epoxy. Suitable lenslet arrays are available, for example, from Adaptive Optics Associates, Inc. of Cambridge, Mass., Advanced Micro Optical Systems, GmbH, of Saarbrucken, Germany, and Corning Rochester Photonics Incorporated of Rochester, N.Y.

Light beams 16a–16e formed by lenslets 14a–14e are incident on micro mirror array 18. Micro mirror array 18 includes N micro mirrors 18a–18e positioned above reference surface 19 and arranged in a pattern, such as a rectangular array, corresponding to the patterns of fiber ends 10a–10e and lenslets 14a–14e. The pitch of micro mirrors 18a–18e, in a direction along surface 19 parallel to a plane of incidence defined by one of light beams 16a–16e and an axis normal to surface 19 at the point at which the light beam would intersect surface 19, is elongated compared to the corresponding pitch of lenslets 14a–14e such that substantially parallel or weakly focused light beams 16a–16e are incident approximately centered on micro mirrors 18a–18e, respectively. The orientations of micro mirrors 18a–18e with respect to reference surface 19 are individually controllable over a range of arbitrary angles (dθ,dφ) by control system 20 with electrical signals transmitted via bus 22.

In one embodiment, micro mirror array 18 is a micro-electro-mechanical system (MEMS) micro mirror array described U.S. patent application Ser. No. 09/779,189, incorporated herein by reference. In this embodiment, micro mirrors 18a–18e are freely rotatable micro-electro-mechanical mirrors actuated by, for example, electrostatic, electromagnetic, piezoelectric, or thermal actuation means incorporated into the micro mirror array. Other types of micro mirrors and micro mirror arrays may also be used. Control system 20 is, for example, an optical switch control system described in U.S. patent application Ser. No. 09/999,705, and U.S. patent application Ser. No. 10/003,659, issued as U.S. Pat. No. 6,614,954, both of which are incorporated herein by reference.

In one implementation, light beams 16a–16e are incident on micro mirror array 18 at an angle of incidence of less than about 25°, as conventionally defined with respect to an axis normal to mirror array reference surface 19, and the footprints of light beams 16a–16e (beam spots) on, respectively, micro mirrors 18a–18e are consequently nearly circular. In this implementation, the angles of incidence of the light beams on individual micro mirrors may vary, for example, from about 15° to abut 35°. In other implementations, the light beams may be incident on micro mirror array 18 at an angle of incidence of, for example about 0° to about 60°.

The beams spots at the micro mirrors may have nearly uniform intensity or, for example, an intensity that varies radially. One of ordinary skill in the art will recognize that the diameters of beam spots having radially varying intensities may be defined in standard manners depending on the form of the intensity distribution. For example, the diameter of a Gaussian beam spot having a radial distribution $I(r)=I(0)\exp(-2(r/w)^2)$ is typically taken to be $2w$.

In one implementation, the beam spots at the micro mirrors are nearly circular with diameters of about 0.6 mm. Small, nearly circular beam spots allow the use of small, nearly circular micro mirrors 18a–18e. This is advantageous, as the smaller the micro mirror, the lower its inertia and the easier it is to move. In addition, nearly circular mirrors experience a more uniform stress from any coating applied to them and thus deform less than do similarly coated substantially noncircular mirrors. Micro mirrors 18a–18e are, for example, approximately elliptical with major and minor diameters of about 1.0 mm and 0.9 mm, respectively.

Micro mirrors 18a–18e reflect incident light beams 16a–16e, respectively, onto fold mirror 24. Fold mirror 24 is, in one implementation, a conventional flat gold coated mirror highly reflective (>98%) at infrared wavelengths including 1310 nm and 1550 nm. Such conventional gold coated mirrors may be obtained from many commercial sources. In another implementation of the illustrated embodiment, fold mirror 24 is a flat dichroic beam splitter that transmits about 30% to about 70%, preferably about 50%, of incident light having a wavelength of about 600 nm to about 1000 nm, and reflects greater than about 90%, preferably greater than about 98%, of incident infrared light having a wavelength of about 1200 nm to about 1700 nm. Such dichroic mirrors may be obtained from numerous vendors.

The reflectivity of such a dichroic beam splitter 24 is typically selected to allow at least partial separation of wavelengths of light used in telecommunications (e.g., 1200 nm–1700 nm) from another range (e.g., 600 nm–1000 nm) of non-telecommunication wavelengths used by control light beams described below. In some embodiments the reflectivity of such a dichroic beam splitter 24 at non-telecommunication wavelengths used by control beams is about 5% to about 95%.

Fold mirror 24 reflects incident light beams 16a–16e onto micro mirror array 26. Micro mirror array 26 includes N micro mirrors 26a–26e positioned above reference surface 28. The orientations of micro mirrors 26a–26e with respect to reference surface 28 are individually controllable by control system 20 with electrical signals transmitted via bus 32. In one implementation, micro mirror arrays 18 and 26 are substantially identical.

Each of micro mirrors 18a–18e is controllable to reflect a light beam incident on it from input fiber block 8 to any one of micro mirrors 26a–26e via fold mirror 24. Hence, control system 20 can control the orientations of micro mirrors 18a–18e to reflect, via fold mirror 24, any one of light beams 16a–16e onto the approximate center of any one of micro mirrors 26a–26e. For example, although FIG. 1 shows light beam 16a reflected by micro mirror 18a to micro mirror 26a via fold mirror 24, light beam 16a could alternatively be reflected by micro mirror 18a to any one of micro mirrors 26b–26e via fold mirror 24. Consequently, light beams 16a–16e are not necessarily substantially parallel to one another between micro mirror array 18 and micro mirror array 26.

Figure 11:
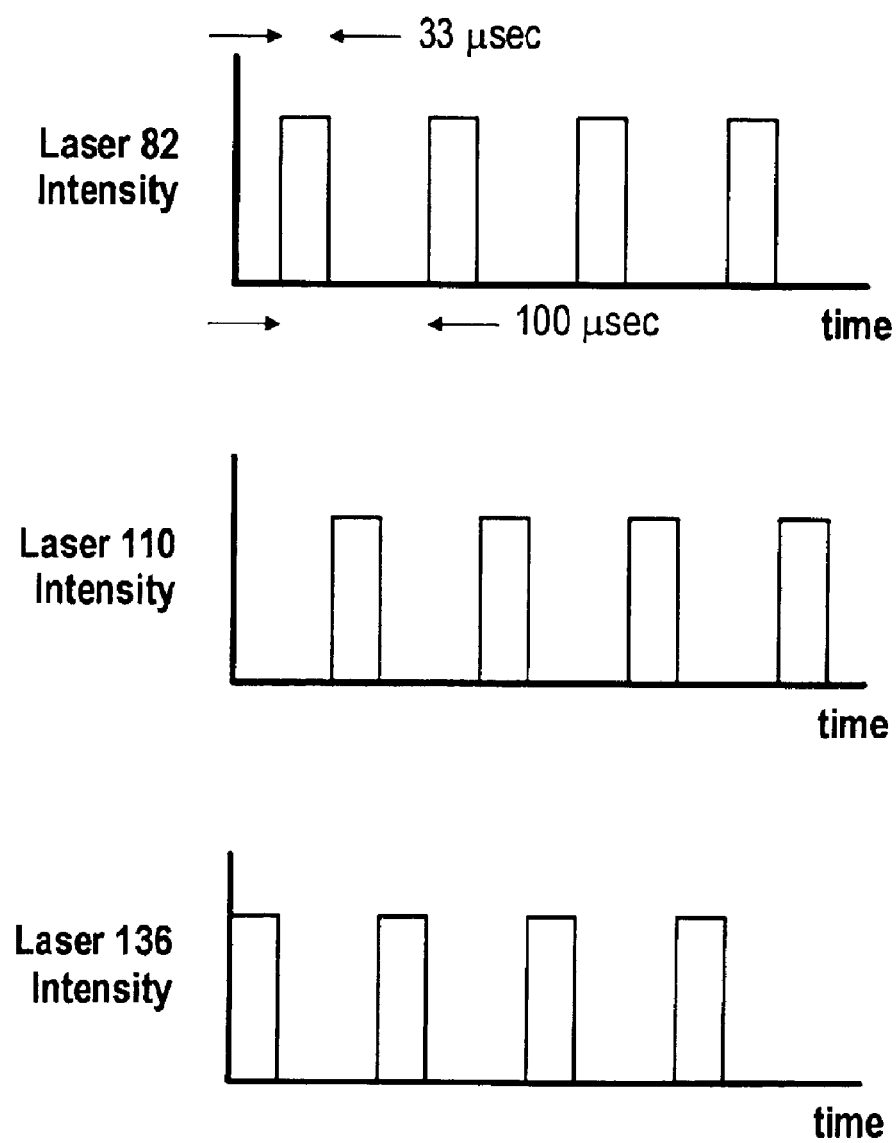
FIG. 11 is a timing diagram showing the relative timing of light pulses provided by three lasers in accordance with an embodiment of the present invention.

Control system 20 controls the orientations of micro mirrors 26a–26e to reflect the light beams incident on them from micro mirror array 18 onto the approximate centers of, respectively, N lenslets 34a–34e of lenslet array 34. FIG. 11 shows micro mirrors 26a–26e reflecting incident light beams 16a–16e to, respectively, lenslets 34a–34e. It should be understood, however, that each particular one of micro mirrors 26a–26e is controlled to reflect whichever one of light beams 16a–16e is incident on it to the lenslet 34a–34e corresponding to that particular micro mirror. For example, micro mirror 26a is controlled to reflect whichever one of light beams 16a–16e is incident on it to lenslet 34a.

Micro mirrors 26a–26e are positioned above surface 28 in a pattern corresponding to the pattern of lenslets 34a–34e with a pitch elongated in one direction such that light beams 16a–16e are substantially parallel or weakly focused between mirror array 26 and lenslet array 34. In one implementation, light beams 16a–16e are reflected from mirror array 26 to lenslet array 34 at an angle of reflection of less than about 25° as conventionally defined with respect to an axis normal to surface 28. Consequently, in this implementation the footprints of light beams 16a–16e on micro mirrors 26a–26e are nearly circular with, for example, beam spot diameters of about 0.6 mm. In this implementation, the angles of reflection of the light beams from the individual micro mirrors may vary, for example, from about 15° to abut 35°. In other implementations, the light beams are reflected from micro mirror array 26 at an angle of reflection of, for example about 0° to about 60°.

Lenslet array 34 is located adjacent to surface 36 of output fiber block 38. Lenslet array 34 is, for example, substantially identical to lenslet array 14.

Output fiber block 38 rigidly positions the N ends 40a–40e of output fibers 6a–6e in a two dimensional array at surface 36. Surface 36 is polished to form a planar surface including optical fiber ends 40a–40e. Output fiber block 38 fixes the positions of fiber ends 40a–40e with respect to other optical elements in optical switch 2, thereby preventing motion of fiber ends 40a–40e from misaligning optical switch 2. Output fiber block 38 is, for example, substantially identical to input fiber block 8.

Lenslets 34a–34e are arranged in a pattern matching that of fiber ends 40a–40e such that lenslets 34a–34e are located with their optical axes approximately centered on, respectively, fiber ends 40a–40e. Lenslets 34a–34e focus light beams reflected by, respectively, micro mirrors 26a–26e into, respectively, the cores of optical fiber ends 40a–40e to complete the connections from input ports to output ports.

Optical fiber switch 2 may be symmetrical. In one symmetrical embodiment, for example, fiber blocks 8 and 38 are substantially identical and symmetrically located with respect to fold mirror 24, lenslet arrays 14 and 34 are substantially identical and symmetrically located with respect to fold mirror 24, and mirror arrays 18 and 26 are substantially identical and symmetrically located with respect to fold mirror 24. The optical paths of light beams 16a–16e may be substantially symmetrical in a symmetrical embodiment in which light beams 16a–16e are focused approximately midway between input fiber ends 10a–10e and output fiber ends 40a–40e.

In one symmetrical embodiment, for example, light beams 16a–16e have beam spot diameters of approximately 0.8 mm at lenslet arrays 14 and 34, approximately 0.6 mm at mirror arrays 18 and 26, and approximately 0.5 mm at fold mirror 24. Such symmetrical embodiments allow bi-directional transmission of light through optical fiber switch 2 with minimal optical power loss, i.e., either ports 4a–4e or ports 6a–6e may be input ports. Moreover, symmetrical embodiments require fewer component types than do unsymmetrical embodiments and are consequently easier and less expensive to construct.

The size of the optical elements in optical fiber switch 2 are typically chosen to be small in order to allow the switch to fit, for example, into a small rack space and to minimize optical power loss in the switch.

Figure 2:
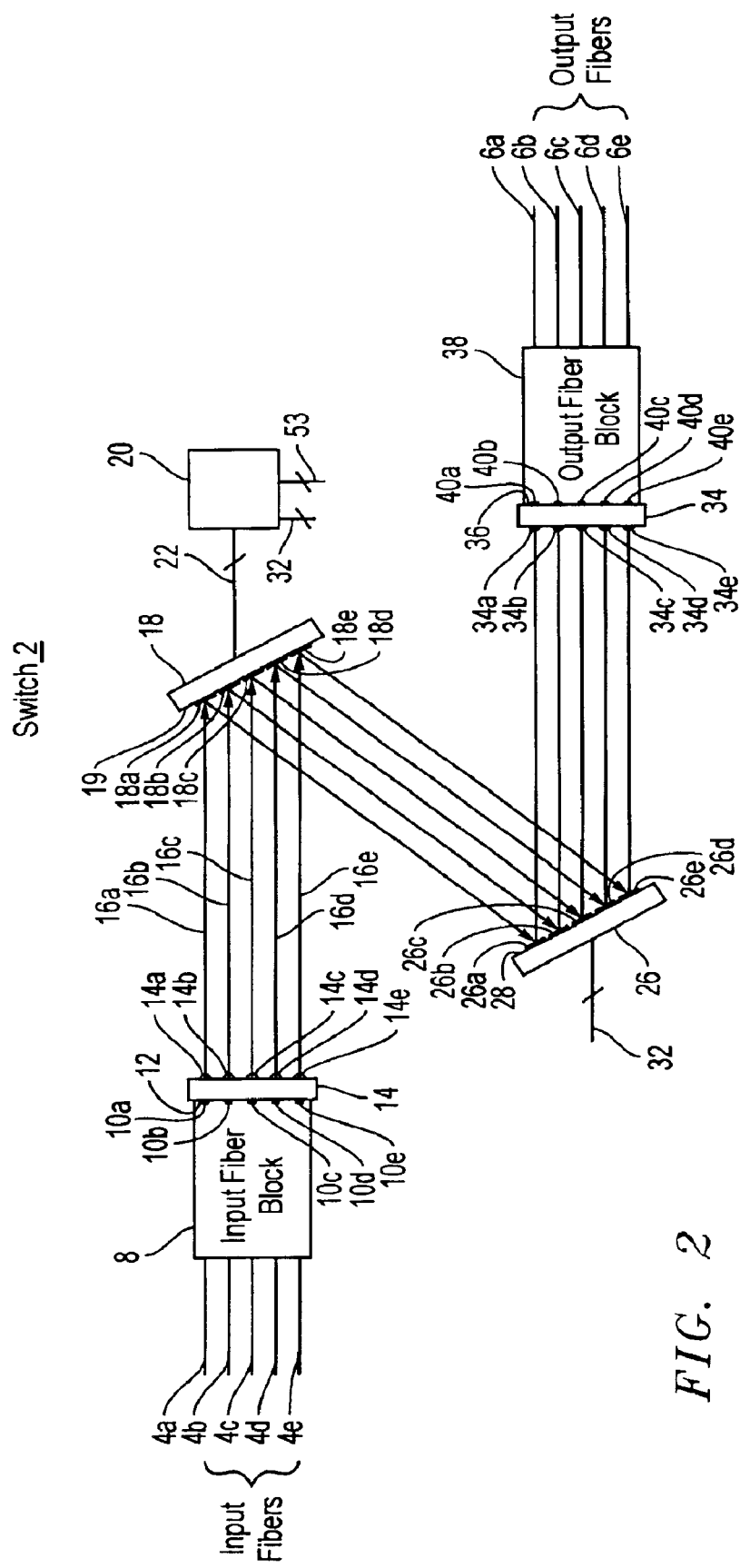
FIG. 2 is a schematic illustration of an optical switch in accordance with another embodiment of the present invention.

The paths of light beams 16a–16e resulting from the folded configuration of mirror array 18, fold mirror 24, and mirror array 26 in the embodiment shown in FIG. 1 are optically equivalent to the paths of light beams 16a–16e resulting from an unfolded configuration in which the location of mirror array 26 is reflected through the plane of fold mirror 24, and fold mirror 24 is removed. For example, FIG. 2 shows an embodiment having an unfolded configuration equivalent to the folded configuration of the embodiment shown in FIG. 1. In the embodiment shown in FIG. 2, each of micro mirrors 18a–18e is controllable to reflect a light beam incident on it from input fiber block 8 directly to any one of micro mirrors 26a–26e.

In the embodiment shown in FIG. 2, mirror arrays 18 and 26 are oriented substantially parallel to each other. Thus, in the optically equivalent embodiment shown in FIG. 1, the relative orientation of mirror arrays 18 and 26 is optically equivalent to substantially parallel. In unfolded embodiments in which micro mirror arrays 18 and 26 are substantially parallel, and in the optically equivalent folded embodiments, the maximum swing angle by which any one of micro mirrors 18a–18e and 26a–26e must be tilted with respect to surfaces 19 and 28, respectively, to direct one of light beams 16a–16e to one of output fibers 6a–6e is reduced compared to embodiments having other optical configurations. In one implementation in which mirror arrays 18 and 26 each include about 1200 mirrors, for example, the maximum angle by which any one of micro mirrors 18a–18e and 26a–26e must be tilted is less than about 10°. Switching time is consequently reduced compared to configurations requiring larger swing angles. Moreover, the maximum optical path difference occurring when one of light beams 16a–16e is switched from one to another of output fibers 6a–6e is correspondingly reduced to less than about 1 centimeter. Consequently, light beams 16a–16e have similar divergences and diameters at, for example, mirror array 26 and lenslet array 34 and thus experience similar attenuation. Thus, coupling loss variation between light beams 16a–16e is small.

Figure 3:
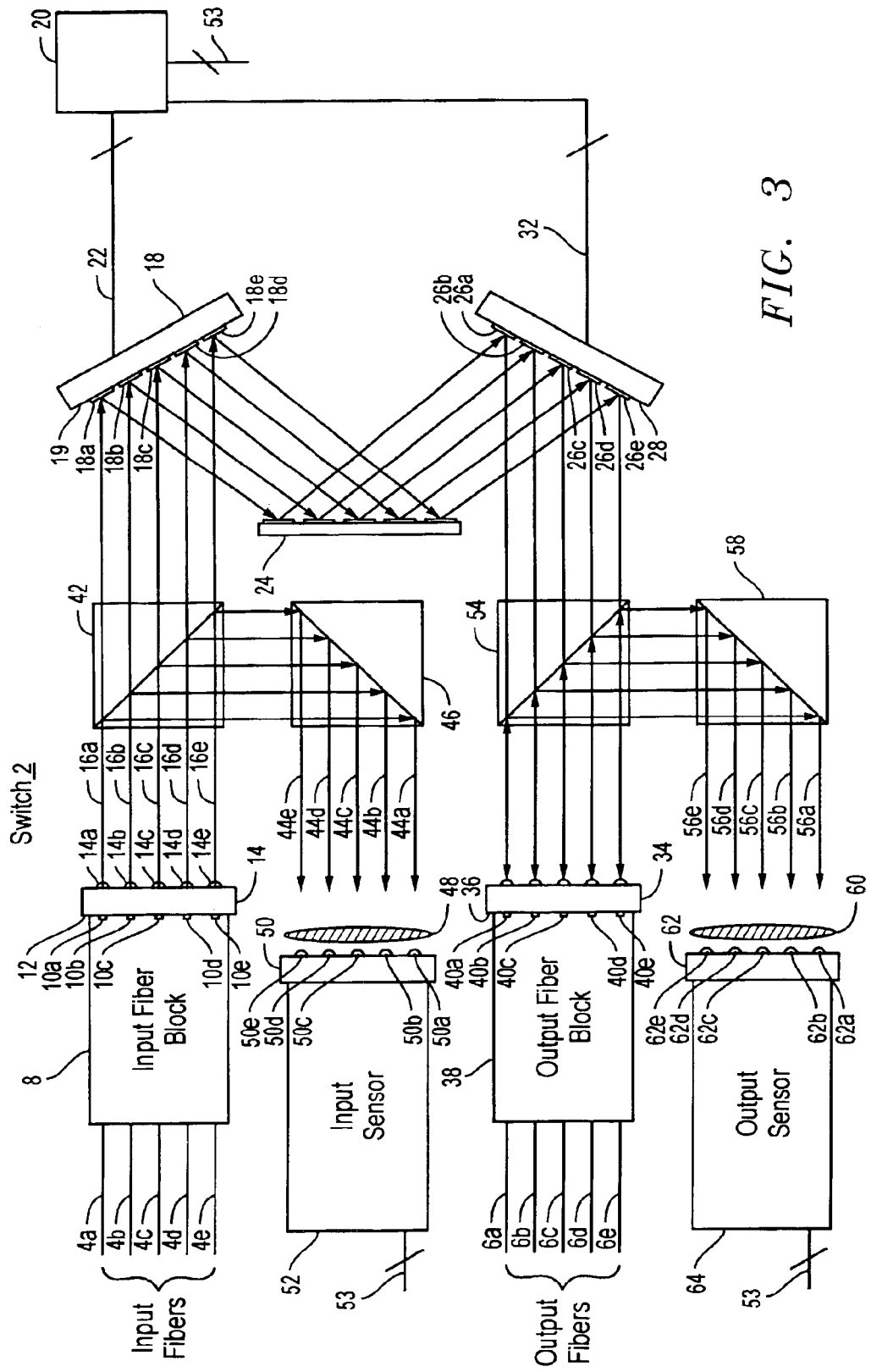
FIG. 3 is a schematic illustration of an optical switch including input and output sensors in accordance with an embodiment of the present invention.

Optical fiber switch 2 may also include a beam splitter located to sample light entering optical switch 2 through input fibers 4a–4e. Such sampling allows the intensities of the input light to be monitored, for example. Referring to FIG. 3, in one embodiment optical fiber switch 2 includes beam splitter 42 located to reflect portions of light beams 16a–16e, respectively, to form N light beams 44a–44e. In one implementation, beam splitter 42 is a cube beam splitter formed from BK 7 optical glass and having a dielectric coating with a reflectivity of about 2% at infrared wavelengths of about 1200 nm to about 1700 nm. In another implementation, beam splitter 42 is a dichroic cube beam splitter formed from BK 7 optical glass and having a dielectric coating with a reflectivity of about 2% at infrared wavelengths of about 1200 to about 1700 and a reflectivity of about 40% to about 60%, preferably about 50%, at wavelengths of about 600 nm to about 1000 nm. Such beam splitters are available, for example, from Harold Johnson Optical Laboratories, Inc. of Gardena, Calif. Suitable coatings for the beam splitter may be obtained, for example, from ZC&R Coatings For Optics, Inc. of Torrance, Calif.

Light beams 44a–44e are reflected by conventional 90° prism 46 (or a conventional mirror), present to provide a convenient optical path, to conventional field lens 48. Conventional field lens 48 collects light beams 44a–44e and directs them onto N lenslets 50a–50e, respectively, of lenslet array 50. In one implementation, the focal length of field lens 48 is about 50 mm and the focal length of lenslets 50a–50e is greater than about 50 mm. The focal length of the combination of lens 48 and lenslets 50a–50e is less than about 50 mm in this implementation. Lenslet array 50 is, for example, a lenslet array similar to lenslet arrays 14 and 34 and available from the same sources.

Lenslets 50a–50e focus light beams 44a–44e to N separate spots on input sensor 52, located adjacent to lenslet array 50. Input sensor 52, which has at least N pixels, detects the intensity of each of light beams 44a–44e to monitor the input signal level to input optical fibers 4a–4e. Input sensor 52 may provide electrical signals corresponding to the detected intensities to control system 20 via bus 53. Thus, input sensor 52 allows input signal presence and level detection for each of input optical fibers 4a–4e. In one implementation, input sensor 52 is a model SU128-1.7RT infrared camera having a 128×128 pixel array available from Sensors Unlimited, Inc. of Princeton, N.J.

Optical fiber switch 2 may also include a beam splitter located to sample light reflected from fiber ends 40a–40e or fiber block 38. Such sampling allows the intensities of the reflected light to be monitored. The measured reflected intensities can be used in a method for aligning optical fiber switch 2. In the embodiment shown in FIG. 3, for example, optical fiber switch 2 includes beam splitter 54 located to form N light beams 56a–56e from portions of light beams 16a–16e reflected by output fiber block 38 or fiber ends 40a–40e. Beam splitter 54 is, for example, substantially identical to beam splitter 42. Light beams 56a–56e are reflected by conventional 90° prism 58 (or a conventional mirror), present to provide a convenient optical path, to conventional field lens 60. Conventional field lens 60 collects light beams 56a–56e and directs them onto N lenslets 62a–62e, respectively, of lenslet array 62. Field lens 60 and lenslet array 62 are, for example, substantially identical to, respectively, field lens 48 and lenslet array 50.

Lenslets 62a–62e focus light beams 56a–56e to N separate spots on output sensor 64, located adjacent to lenslet array 62. Output sensor 64, which has at least N pixels, detects the intensity of each of light beams 56a–56e and provides corresponding electrical signals to control system 20 via bus 53. The intensities of light beams 56a–56e depend, respectively on how well aligned the light beams reflected by micro mirrors 26a–26e are with, respectively, input fiber ends 40a–40e. The intensity of light beam 56a, for example, is at a local minimum when the light beam reflected by micro mirror 26a is focused by lenslet 34a to the approximate center of the core of fiber end 40a, and increases if the light beam is directed to focus on the cladding of fiber end 40a or on output fiber block 38 near fiber end 40a (the cladding and the fiber block are more reflective than the fiber core). Thus, if light beams 16a–16e are known to be otherwise well aligned (from diagnostics discussed below), minimized reflected intensities verify that output signals are present on output fibers 6a–6e. Moreover, the intensity of a reflected light beam is also high if the corresponding output optical fiber is broken. Thus, output sensor 64 allows output fiber fault detection.

In one embodiment, Q of the N input optical fibers and Q of the P output optical fibers are monitor channels dedicated to monitoring the performance of optical switch 2. In one implementation, for example, 9 of 1200 input optical fibers and 9 of 1200 output optical fibers are monitor channels. Typically, the monitor channels are distributed approximately uniformly in the arrays of fibers formed by input fiber block 8 and output fiber block 38. For example, nine monitor channels may be distributed among four corners, four edges, and the center of a rectangular array of input or output optical fibers. The spatial distributions of the input and output monitor channels need not match.

Figure 4:
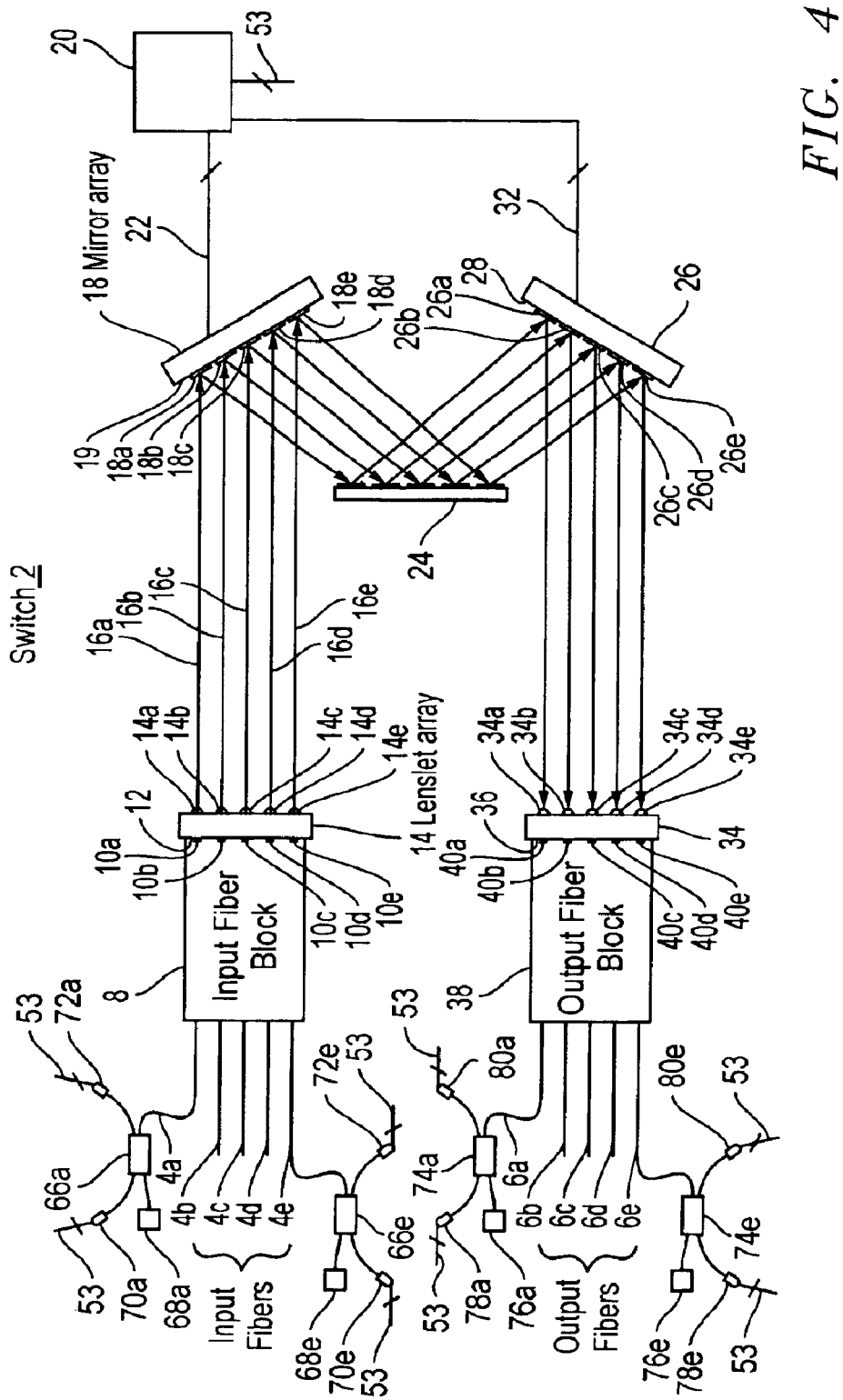
FIG. 4 is a schematic illustration of an optical switch including monitor channels in accordance with an embodiment of the present invention.

In the embodiment shown in FIG. 4, for example, optical fibers 4a and 4e and optical fibers 6a and 6e are monitor channels. Of course, other choices for monitor channels may also be made. Light beams 16a and 16e, which are monitor light beams in this embodiment, are formed, respectively, from light output by lasers 68a and 68e and coupled by, respectively, conventional fiber couplers 66a and 66e to, respectively, input optical fibers 4a and 4e. Detectors 72a and 72e are coupled by, respectively, fiber couplers 66a and 66e to, respectively, optical fibers 4a and 4e to measure the intensity of light coupled into those fibers from, respectively, lasers 68a and 68e. Detectors 72a and 72e provide electrical signals corresponding to the light intensities they measure to control system 20 via bus 53.

Monitor light beams 16a and 16e may be directed with micro mirrors 18a, 18e, 26a, and 26e to either of (monitor channel) optical fibers 6a and 6e. Detectors 78a and 78e are coupled by, respectively, conventional fiber couplers 74a and 74e to, respectively, optical fibers 6a and 6e to detect the intensity of light output by one of lasers 68a and 68e and coupled into those optical fibers. Detectors 78a and 78e provide electrical signals corresponding to the light intensities they measure to control system 20 via bus 53.

Alternatively, monitor light beams may be formed, respectively, from light output by lasers 76a and 76e coupled by, respectively, conventional fiber couplers 74a and 74e to, respectively, optical fibers 6a and 6e. Detectors 80a and 80e are coupled by, respectively, fiber couplers 74a and 74e to, respectively, optical fibers 6a and 6e to measure the intensity of light coupled into those fibers from, respectively, lasers 76a and 76e. Detectors 80a and 80e provide electrical signals corresponding to the light intensities they measure to control system 20 via bus 53.

Monitor light beams formed using lasers 76a and 76e may be directed with micro mirrors 18a, 18e, 26a, and 26e to either of optical fibers 4a and 4e. Detectors 70a and 70e are coupled by, respectively, conventional fiber couplers 66a and 66e to, respectively, optical fibers 4a and 4e to detect the intensity of light output by one of lasers 76a and 76e and coupled into those optical fibers. Detectors 70a and 70e provide electrical signals corresponding to the light intensities they measure to control system 20 via bus 53.

Thus, control system 20 may determine the attenuation of monitor light beams during their passage through optical switch 2. Measurements of such attenuation are used in a recalibration method discussed below.

Lasers 68a, 68e, 76a, and 76e are, for example, conventional semiconductor laser diodes capable of operating at wavelengths of about 1310 nm or about 1550 nm. Detectors 70a, 70e, 72a, 72e, 78a, 78e, 80a and 80e are, for example, conventional InGaAs photodiodes capable of detecting light output by lasers 68a, 68e, 76a, and 76e.

Figure 5:
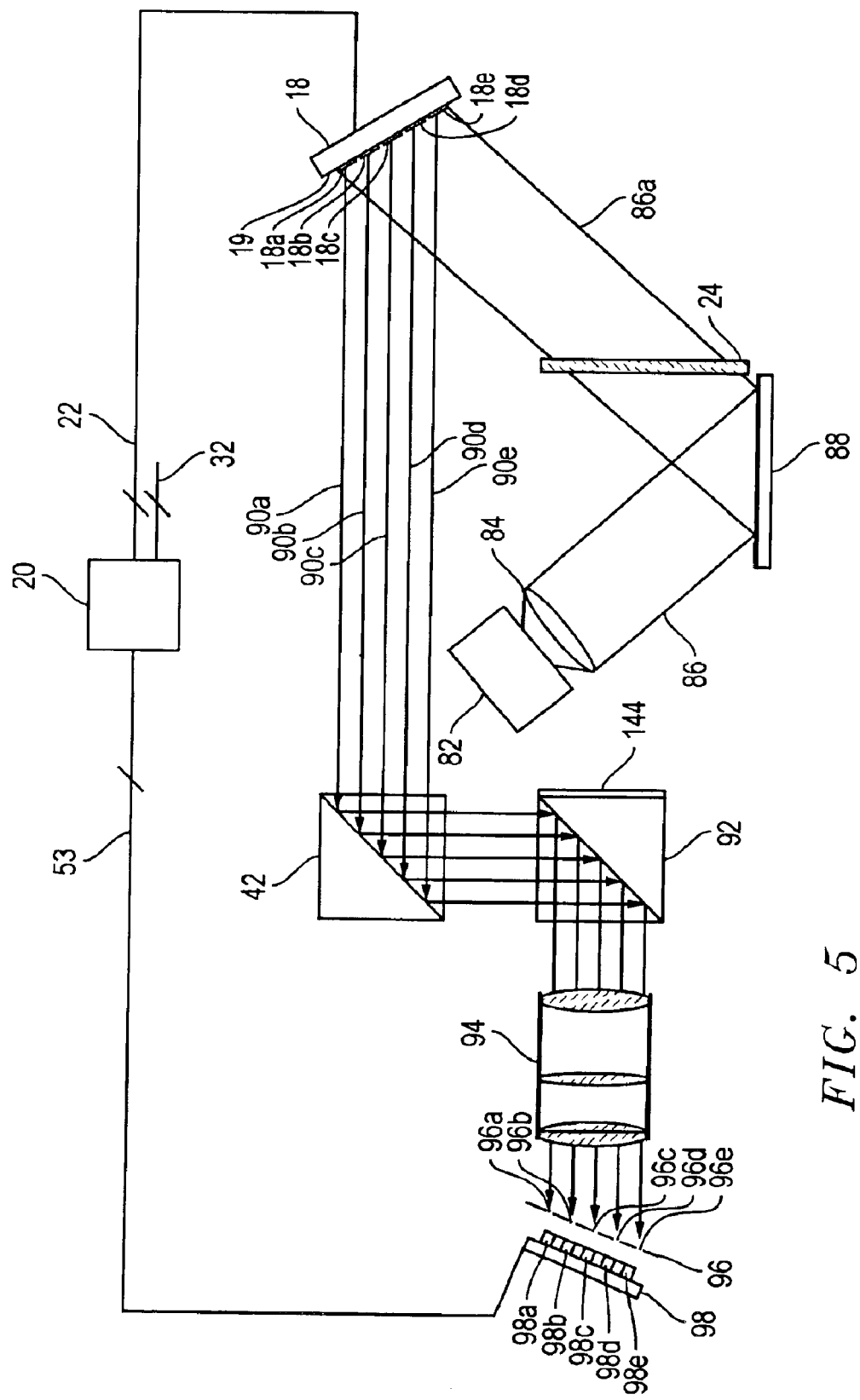
FIG. 5 is a schematic illustration of optical paths of control light beams in an optical switch in accordance with an embodiment of the present invention.

The orientation of mirrors 18a–18e may be measured and controlled without the use of light beams 16a–16e. Referring to FIG. 5, for example, in one embodiment, about 300 milliwatts (mW) of light having a wavelength of about 660 nm is output by laser 82, collimated by lens group 84 to form light beam 86, and reflected by a conventional highly reflective mirror 88 onto dichroic beam splitter 24. Other embodiments may use lasers operating at other non-telecommunication wavelengths such as at 810 nm, for example. Typically, the output power of the laser is chosen to provide an adequate signal to noise ratio for measurements using position sensing detectors described below. Approximately 50% of light beam 86 is transmitted by dichroic beam splitter 24 as light beam 86a incident on mirror array 18 with a beam width sufficient to illuminate all of micro mirrors 18a–18e. The path of the approximately 50% of light beam 86 reflected by dichroic beam splitter 24 is described below with reference to FIG. 6. Laser 82 is, for example, a conventional laser diode. Suitable laser diodes are available, for example, from Semiconductor Laser International Corporation of Binghamton, N.Y. and from SDL, Inc. of San Jose, Calif. Lens group 84 has, for example, a focal length of about 80 to about 100 millimeters.

Micro mirrors 18a–18e (FIG. 5) reflect portions of light beam 86a to form N control light beams 90a–90e incident on dichroic beam splitter 42. Dichroic beam splitter 42 reflects light beams 90a–90e to conventional beam splitter 92, which reflects about 50% of each of light beams 90a–90e to lens group 94. Lens group 94 focuses light beams 90a–90e onto N apertures 96a–96e of aperture plate 96. Aperture plate 96 is, for example, formed from sheet metal and is about 0.3 mm thick. Apertures 96a–96e which are, for example, circular with a diameter of about 0.5 mm, are arranged in a pattern corresponding to that of micro mirrors 18a–18e, such as a rectangular array with a pitch of about 1 mm. Light beams 90a–90e pass through apertures 96a–96e, which remove their diffracted edges, and are incident on N corresponding position sensing detectors 98a–98e included in position sensing detector array 98 located behind aperture plate 96. Position sensing detectors 98a–98e are arranged in a pattern corresponding to that of micro mirrors 18a–18e, such as a rectangular array with a pitch of about 1 mm.

Position sensing detector array 98 is, for example, a two dimensional array of quadrant cell photodiodes bonded to a glass wafer. In one implementation, the cells are electrically isolated from each other by sawing or dicing the array after bonding to the glass wafer. Suitable quadrant cell photodiode arrays are available, for example, from UDT Sensors, Inc. of Hawthorne, Calif. and from Pacific Silicon Sensor, Inc. of Westlake Village, Calif.

Lens group 94 is a conventional lens group chosen to have a tilted object plane located about coincident with surface 19 of mirror array 18 and a tilted image plane located about coincident with aperture plate 96. Lens group 94 images micro mirrors 18a–18e onto aperture array 96 with about 1:1 magnification. The images of micro mirrors 18a–18e (particularly their centroids) at aperture array 96 are stationary, i.e., they do not substantially move when micro mirrors 18a–18e are angularly displaced (tilted) with respect to surface 19. The images are stationary at aperture plate 96 because all rays of light originating from a point in the object plane of lens group 94 and passing through lens group 94 are focused approximately to a corresponding point in the image plane. Hence, angular displacements of micro mirrors 18a–18e change the paths taken by light beams 90a–90e through lens group 94 without changing the locations at aperture plate 96 at which micro mirrors 18a–18e are imaged. However, since position sensing detector array 98 is located behind the image plane of lens group 94, the images of micro mirrors 18a–18e on detector array 98 are displaced in the plane of array 98 when the corresponding micro mirrors are angularly displaced. Hence, the orientations of micro mirrors 18a–18e can be determined from the positions of light beams 90a–90e measured by, respectively, position sensing detectors 98a–98e. Position sensing detectors 98a–98e provide electrical signals indicating the positions of light beams 90a–90e to control system 20 via bus 53.

The linear displacements of light beams 90a–90e on detectors 98a–98e due to angular displacements of micro mirrors 18a–18e increase as the separation between position sensing detector array 98 and the image plane of lens group 94 is increased. Thus, the range over which the orientations of micro mirrors 18a–18e are measured can be varied by varying the position of detector array 98 with respect to aperture plate 96. In one implementation, detector array 98 is located parallel to and about 0.5 mm to about 1 mm behind the image plane of lens group 94 (or aperture plate 96), and light beams 90a–90e have beam spot diameters of about 0.5 mm at detectors 98a–98e. Detectors 98a–98e are each about 1 mm square. In this implementation, linear displacements of about ±0.25 mm (the maximum without shifting the beam spots off of the detectors) with respect to the centers of detectors 98a–98e correspond to angular displacements of light beams 90a–90e by about ±20°, and of micro mirrors 18a–18e by about ±10°. If the dynamic range of detectors 98a–98e (determined by the incident optical power) is 12 bits, as is typical, then the orientation of light beams 90a–90e can be determined, in principle, with a resolution of about 0.01° (40°/4096). Such an angular resolution requires detectors 98a–98e to resolve linear displacements of about 0.12 microns, however. In practice, the orientations of light beams 90a–90e are typically determined with a resolution of about 0.08°, and thus to about 9 bit accuracy. Consequently, the electrical signals provided by detectors 98a–98e allow control system 20 to control the orientations of micro mirrors 18a–18e with a resolution of about 0.04° (about 9 bit accuracy).

It should be noted that the orientations of micro mirrors 18a–18e may be measured and controlled to a resolution of about 0.04° without the use of mirror 88, dichroic beam splitter 42, and beam splitter 92, which are present to provide a convenient optical path for light beams 86a and 90a–90e.

Figure 6:
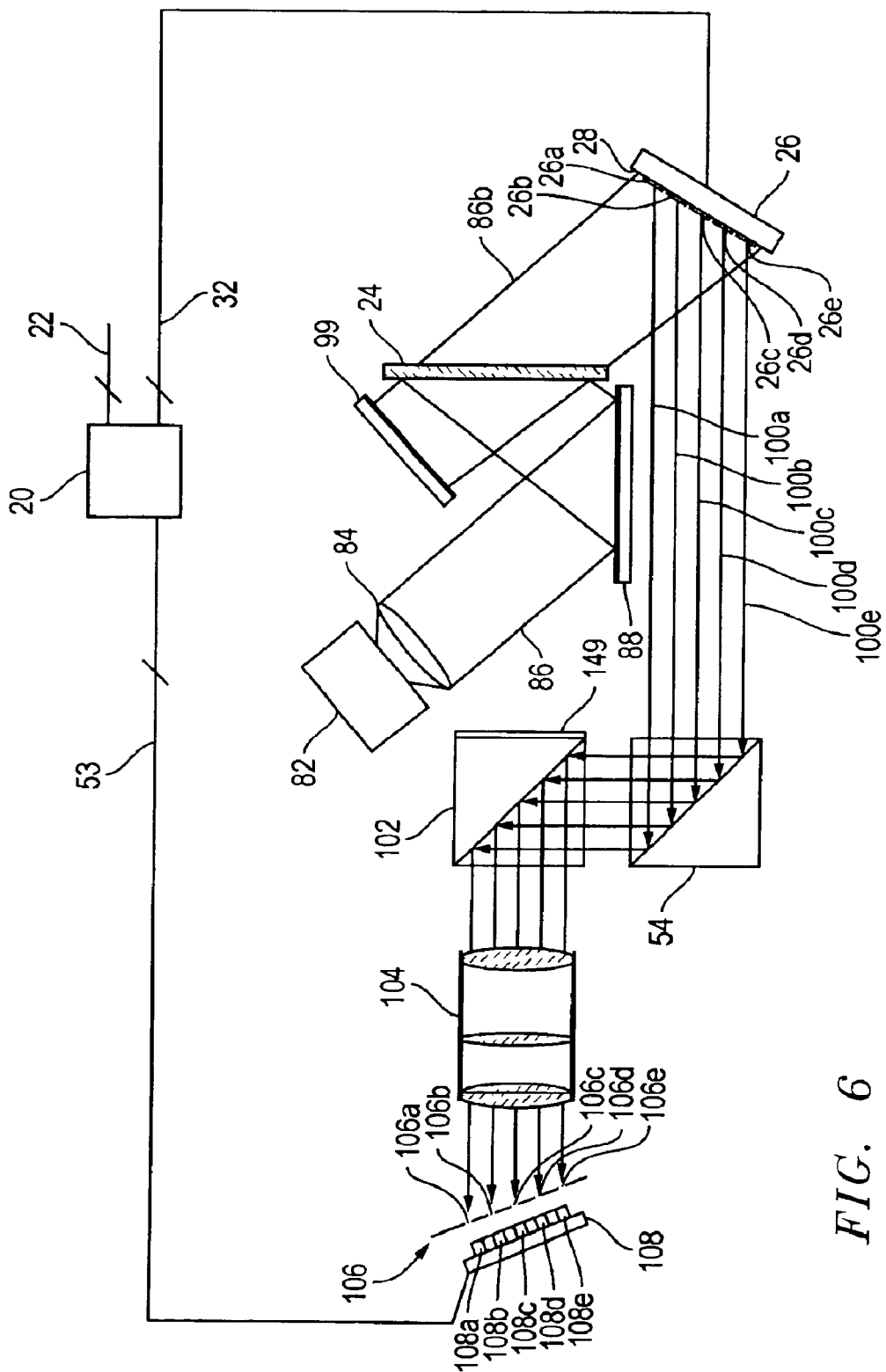
FIG. 6 is a schematic illustration of optical paths of control light beams in an optical switch in accordance with another embodiment of the present invention.

The orientations of mirrors 26a–26e may be similarly measured and controlled without the use of light beams 16a–16e. Referring to FIG. 6, for example, in one embodiment approximately 50% of light beam 86, formed as described above with reference to FIG. 5, is reflected by dichroic beam splitter 24 to conventional highly reflective mirror 99, which reflects it back to dichroic beam splitter 24. Approximately 50% of the light reflected onto dichroic beam splitter 24 by mirror 99 is transmitted by fold beam splitter 24 as light beam 86b incident on mirror array 26.

Micro mirrors 26a–26e reflect portions of light beam 86b to form N control light beams 100a–100e incident on dichroic beam splitter 54. Dichroic beam splitter 54 reflects light beams 100a–100e to conventional beam splitter 102, which reflects about 25% of each of light beams 100a–100e to lens group 104. Lens group 104 focuses light beams 100a–100e onto N apertures 106a–106e of aperture plate 106. Aperture plate 106 is, for example, substantially identical to aperture plate 96. Light beams 100a–100e pass through apertures 106a–106e, which remove their diffracted edges, and are incident on N corresponding position sensing detectors 108a–108e in position sensing detector array 108 located behind aperture plate 106. Position sensing detector array 108 is, for example, substantially identical to position sensing detector array 98 and available from the same sources. Position sensing detectors 108a–108e are arranged in a pattern corresponding to that of micro mirrors 26a–26e, such as a rectangular array with a pitch of about 1 mm.

Lens group 104 is a conventional lens group chosen to have a tilted object plane located about coincident with surface 28 of mirror array 26 and a tilted image plane located about coincident with aperture plate 106. Lens group 104 images micro mirrors 26a–26e onto aperture plate 106 with about 1:1 magnification. Lens group 104 is, for example, substantially identical to lens group 94. The images of micro mirrors 26a–26e (particularly their centroids) at aperture array 106 do not move when micro mirrors 26a–26e are angularly displaced with respect to surface 28. However, the images of micro mirrors 26a–26e on detector array 108 are displaced in the plane of array 108 when the corresponding micro mirrors are angularly displaced. Hence, the orientations of micro mirrors 26a–26e can be determined from the positions of light beams 100a–100e measured by, respectively, position sensing detectors 108a–108e. Position sensing detectors 108a–108e provide electrical signals indicating the positions of light beams 100a–100e to control system 20 via bus 53.

The range over which the orientations of micro mirrors 26a–26e are measured is determined similarly to that over which the orientations of micro mirrors 18a–18e are measured. In particular, since the linear displacements of light beams 100a–100e on detectors 108a–108e due to angular displacements of micro mirrors 26a–26e increase as the separation between position sensing detector array 108 and the image plane of lens group 104 (or aperture plate 106) is increased, the range over which the orientation of micro mirrors 26a–26e are measured can be varied by varying the position of detector array 108 with respect to aperture plate 106. In one implementation, detector array 108 is located parallel to and about 0.5 mm to about 1 mm behind aperture plate 106, and light beams 100a–100e have beam spot diameters of about 0.5 mm at detectors 108a–108e, which are each about 1 mm square. In this implementation, linear displacements of about ±0.25 mm with respect to the centers of detectors 108a–108e correspond to angular displacements of light beams 100a–100e by about ±20°, and of micro mirrors 26a–26e by about ±10°. The orientation of light beams 100a–100e can be determined, in principle, with a resolution of about 0.01° if detectors 108a–108e have a dynamic range of 12 bits. In practice, the orientations of light beams 100a–100e are typically determined with a resolution of about 0.08°, and thus to about 9 bit accuracy. Consequently, the electrical signals provided by detectors 108a–108e allow control system 20 to control the orientations of micro mirrors 26a–26e with a resolution of about 0.04° (about 9 bit accuracy).

It should be noted that the orientations of micro mirrors 26a–26e may be measured and controlled with a resolution of about 0.04° without the use of mirror 88, mirror 99, dichroic beam splitter 54, and beam splitter 102, which are present to provide a convenient optical path for light beams 86b and 100a–100e.

The electrical signals provided by position sensing detectors 98a–98e and 108a–108e also allow control system 20 to detect malfunctioning micro mirrors.

Figure 7:
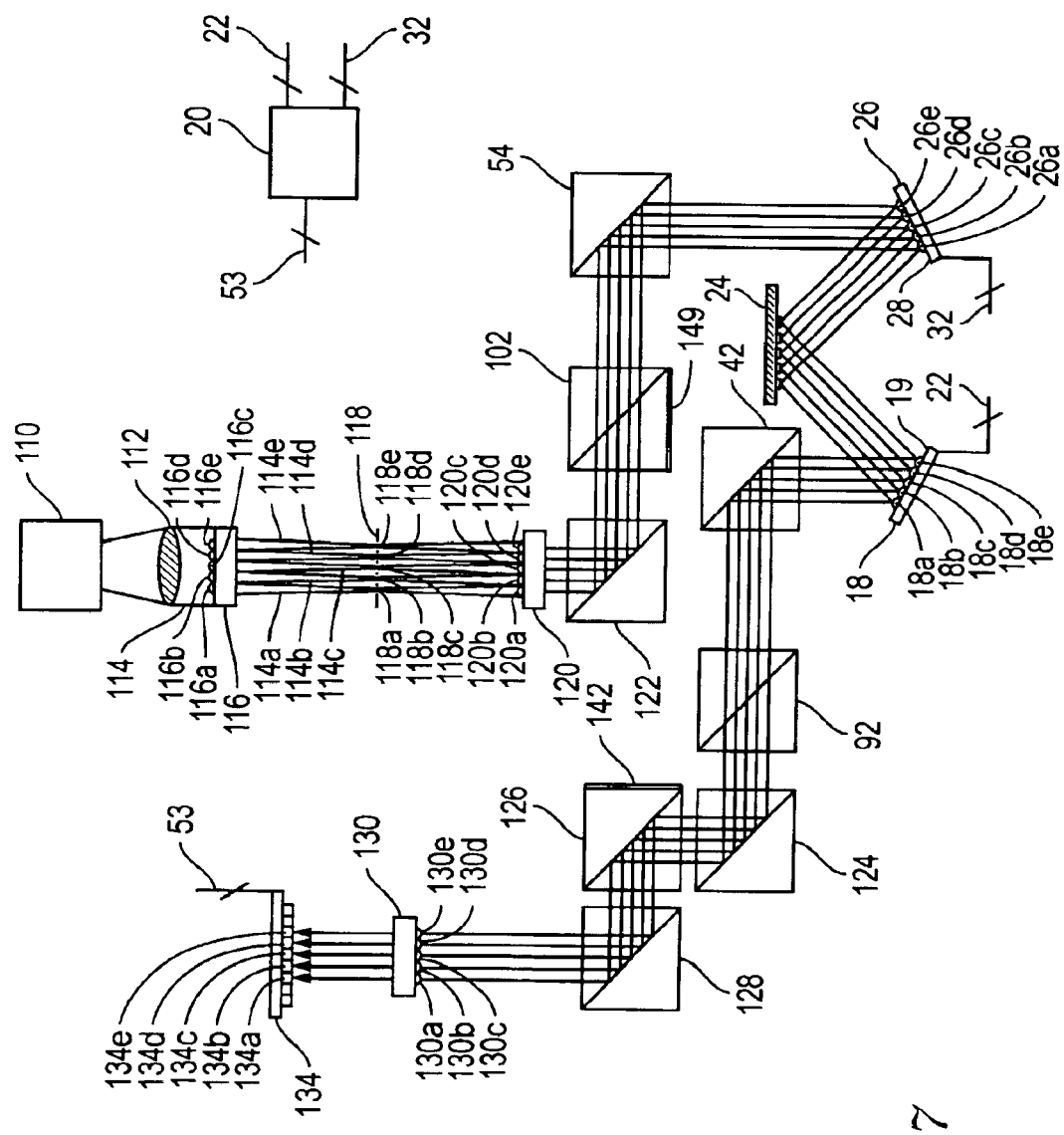
FIG. 7 is a schematic illustration of optical paths of control light beams in an optical switch in accordance with another embodiment of the present invention.

Angular displacements of micro mirrors 18a–18e and 26a–26e may also be measured and controlled with N control light beams (different from light beams 16a–16e) each of which is reflected from one of micro mirrors 18a–18e and one of micro mirrors 26a–26e. Referring to FIG. 7, for example, in one embodiment about 30 mW of light having a wavelength of about 660 nm is output by laser 110 and collimated by conventional lens group 112 to form light beam 114 incident on lenslet array 116. Laser 110 is, for example, a conventional laser diode similar or identical to laser 82. Lens group 112 has a focal length of, for example, about 80 millimeters to about 100 millimeters.

Lenslet array 116 includes N lenslets 116a–116e arranged in a pattern corresponding to that of micro mirrors 26a–26e, such as a rectangular array with a pitch of about 1 mm. Lenslets 116a–116e, which have focal lengths of about 100 mm, for example, form N corresponding substantially parallel or weakly focused control light beams 114a–114e from portions of light beam 114 and focus them to diameters of, for example, about 0.16 mm at, respectively, apertures 118a–118e of aperture plate 118. Aperture plate 118 is, for example, formed from sheet metal and is about 0.3 mm thick. Apertures 118a–118e, which are circular with a diameter of about 0.16 mm, for example, are arranged in a pattern matching that of lenslets 116a–116e.

Light beams 114a–114e pass through apertures 118a–118e, by which they are spatially filtered, and are incident on and recollimated by, respectively, N lenslets 120a–120e of lenslet array 120. Lenslets 120a–120e are arranged in a pattern matching that of lenslets 116a–116e and have focal lengths, for example, of about 77 mm. Lenslet arrays 116 and 120 are, for example, similar to lenslet arrays 14, 34, 50, and 62 and available from the same sources.

Conventional 90° prism 122 reflects light beams 114a–114e to conventional beam splitter cube 102, which transmits about 75% of each of light beams 114a–114e to dichroic beam splitter 54. Dichroic beam splitter 54 reflects light beams 114a–114e to, respectively, micro mirrors 26a–26e of mirror array 26. Light beams 114a–114e are substantially parallel to light beams 16a–16e (FIG. 3) between dichroic beam splitter 54 and mirror array 26.

If micro mirrors 26a–26e are approximately oriented to direct light carried by input optical fibers 4a–4e to output optical fibers 6a–6e as described above, then micro mirrors 26a–26e reflect light beams 114a–114e to micro mirrors 18a–18e via dichroic beam splitter 24. It should be noted that although FIG. 7 shows light beams 114a–114e directed, respectively, to micro mirrors 18a–18e, each of light beams 114a–114e may be directed to any one of micro mirrors 18a–18e.

If micro mirrors 18a–18e are approximately oriented to direct light carried by input optical fibers 4a–4e to output optical fibers 6a–6e, then micro mirrors 18a–18e reflect whichever ones of light beams 114a–114e are incident on them from mirror array 26 to dichroic beam splitter 42 as substantially parallel or weakly focused beams of light substantially parallel to light beams 16a–16e (FIG. 3). Dichroic beam splitter 42 reflects light beams 114a–114e to conventional beam splitter cube 92, which transmits about 50% of each of light beams 114a–114e to conventional 90° prism 124. Prism 124 reflects light beams 114a–114e to conventional beam splitter cube 126, which reflects about 50% of each of light beams 114a–114e to conventional 90° prism 128. Prism 128 reflects light beams 114a–114e onto lenslet array 130, which includes N lenslets 130a–130e arranged in a pattern corresponding to that of micro mirrors 18a–18e, such as a rectangular array with a pitch of about 1 mm. Lenslet array 130 is, for example similar to the lenslet arrays described above and available from the same sources.

Lenslets 130a–130e focus the particular ones of light beams 114a–114e reflected by, respectively, micro mirrors 18a–18e onto, respectively, position sensing detectors 134a–134e of position sensing detector array 134 located at about the focal plane of lenslet array 130. Position sensing detector array 134 is, for example, similar or identical to position sensing detector arrays 98 and 108 and available from the same sources. Position sensing detectors 134a–134e are arranged in a pattern corresponding to that of micro mirrors 18a–18e, such as a rectangular array with a pitch of about 1 mm, for example.

Light beams 114a–114e are linearly displaced in the plane of detector array 134 when the micro mirrors in mirror arrays 18 and 26 from which they reflect are angularly displaced. The magnitude of the linear displacement of a particular one of light beams 114a–114e is about equal to the product of the focal length of the lenslet focusing it onto detector array 134 and the tangent of the beam's angular displacement. Thus, if only one of the micro mirrors from which the beam is reflected is angularly displaced, the angular displacement of that micro mirror can be determined from the linear displacement of the beam on detector array 134. Position sensing detectors 134a–134e provide electrical signals indicating the position of light beams 114a–114e to control system 20 via bus 53.

The range over which angular displacements of light beams 114a–114e are measured is determined by the diameters of the beams at detectors 134a–134e, the size of detectors 134a–134e, and the focal lengths of lenslets 130a–130e. In one implementation, for example, the lenslets have focal lengths of 100 mm, the beams have beam spot diameters of about 0.5 mm at detector array 134, and detectors 134a–134e are about 1 mm square. In this implementation, linear displacements of about ±0.25 mm (the maximum without shifting the beam spots off of the detectors) with respect to the centers of the detectors correspond to angular displacements of light beams 114a–114e by about ±0.15°. If detectors 134a–134e have a 5 bit dynamic range, which is easily achieved, then angular displacements of light beams 114a–114e can be determined to a resolution of about 0.01° (5 bit accuracy). Consequently, the orientations of micro mirrors 18a–18e and 26a–26e may be controlled using measurements made with detectors 134a–134e with a resolution of about 0.005°. Such an angular resolution requires detectors 134a–134e to resolve linear displacements of about 17 microns. Control system 20 may thus control the orientations of micro mirrors 18a–18e and 26a–26e with about 12 bit accuracy, since detectors 98a–98e and 108a–108e allow the micro mirrors to be controlled over a range of about 20°, and detectors 134a–134e allow the micro mirrors to be controlled with a resolution of about 0.005°.

It should be noted that angular displacements of micro mirrors 18a–18e and 26a–26e may be measured and controlled with a resolution of about 0.005° without the use of prism 122, beam splitter 102, beam splitter 92, prism 124, beam splitter 126, and prism 128, which are present to provide a convenient optical path for light beams 114a–114e.

The electrical signal provided by a position sensing detector to control system 20 when a control light beam is incident on the detector can vary in time (drift) even if the location at which the control light beam is incident on the detector does not change, i.e., the control light beam does not move. Thus, the electrical signal provided by the position sensing detector can indicate apparent motion of the control light beam (and micro mirrors from which it is reflected) even if no such motion has occurred, and thereby introduce errors into the measurement and control of the orientations of those micro mirrors. Such detector drift can be caused, for example, by time varying temperature gradients across the detector which produce time varying spatial gradients in detector responsivity.

The effects of such drift can be reduced by the use of a plurality of reference beams, each of which is incident on the approximate center of a corresponding one of the position sensing detectors. If the control light beams and reference light beams are time gated (pulsed) and interleaved in time, then the position sensing detectors can provide separate electrical signals indicating the locations at which the reference and control light beams are incident on the detectors. Since the electrical signals provided by a position sensing detector in response to control and reference light beams drift similarly, a difference signal generated, for example, by subtracting the signal provided in response to the reference beam from the signal provided in response to a control beam can be substantially free of drift.

Figure 8:
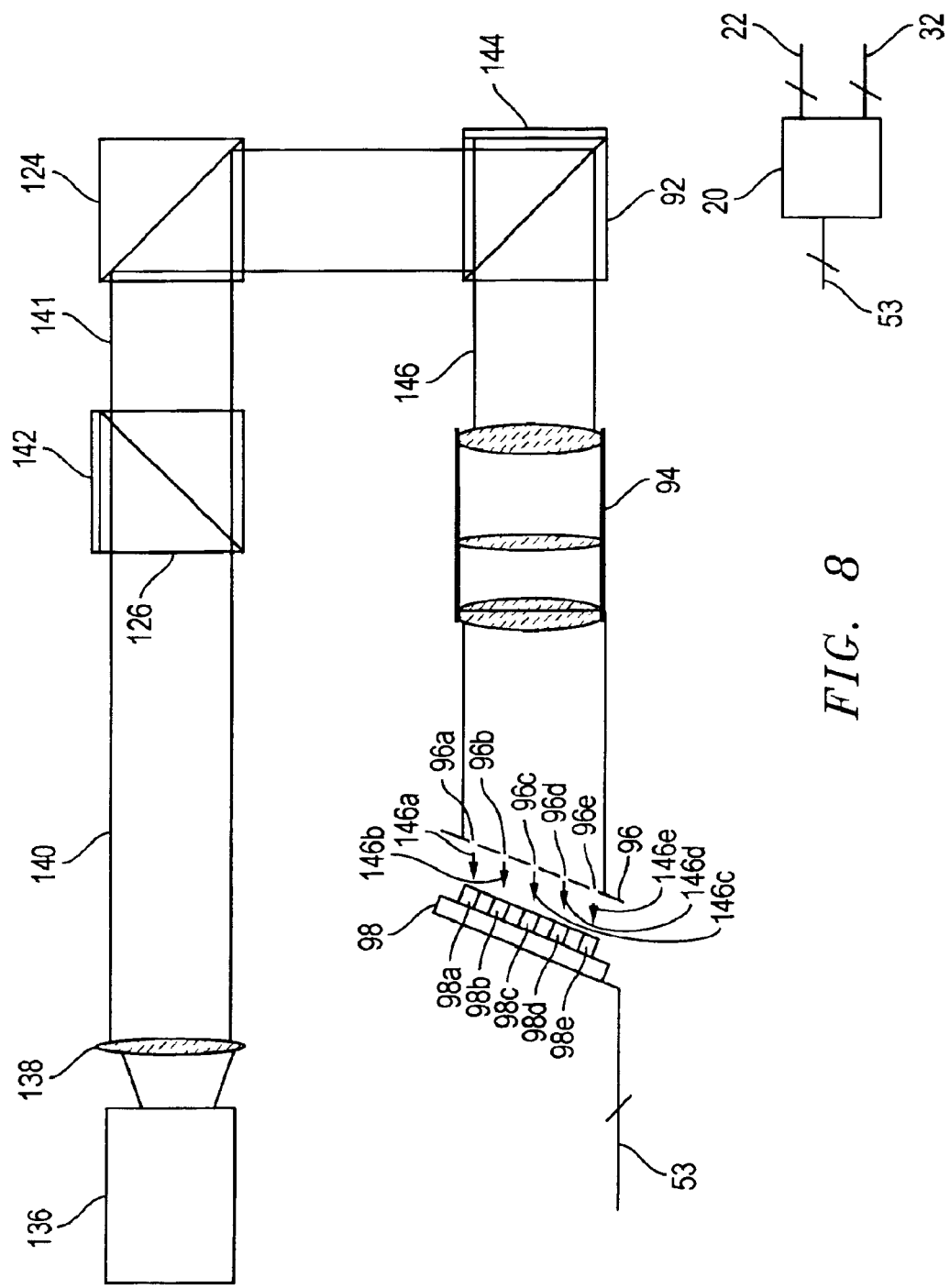
FIG. 8 is a schematic illustration of optical paths of reference light beams in an optical switch in accordance with an embodiment of the present invention.

Accordingly, reference beams may be used to reduce the effects of detector drift on the measurement and control of micro mirrors 18a–18e and 26a–26e. Referring to FIG. 8, for example, in one embodiment about 30 mW of light having a wavelength of about 660 nm is output by conventional laser 136 and collimated by conventional lens group 138 to form light beam 140 incident on conventional beam splitter cube 126. Laser 136 is, for example, similar or identical to lasers 82 and 110 and available from the same sources.

About 50% of light beam 140 is transmitted by beam splitter 126 as light beam 141 to conventional 90° prism 124, which reflects light beam 141 to conventional beam splitter cube 92. Beam splitter cube 92 reflects about 50% of light beam 141 to conventional highly reflective mirror 144, which retroreflects it through beam splitter 92 to lens group 94 as light beam 146. Mirror 144 is, for example, a conventional highly reflective metal or dielectric coating on a surface of beam splitter 92.

Lens group 94 directs light beam 146 onto aperture array 96. Lens group 94 and aperture array 96 were described above with reference to FIG. 5. Apertures 96a–96e of aperture array 96 form, respectively, N reference light beams 146a–146e having beam spot diameters of about 0.5 mm and incident on the approximate centers of, respectively, position sensing detectors 98a–98e of position sensing detector array 98. Position sensing detectors 98a–98e provide electrical signals indicating the (physically stationary) positions of reference light beams 146a–146e to control system 20 via bus 53.

Figure 9:
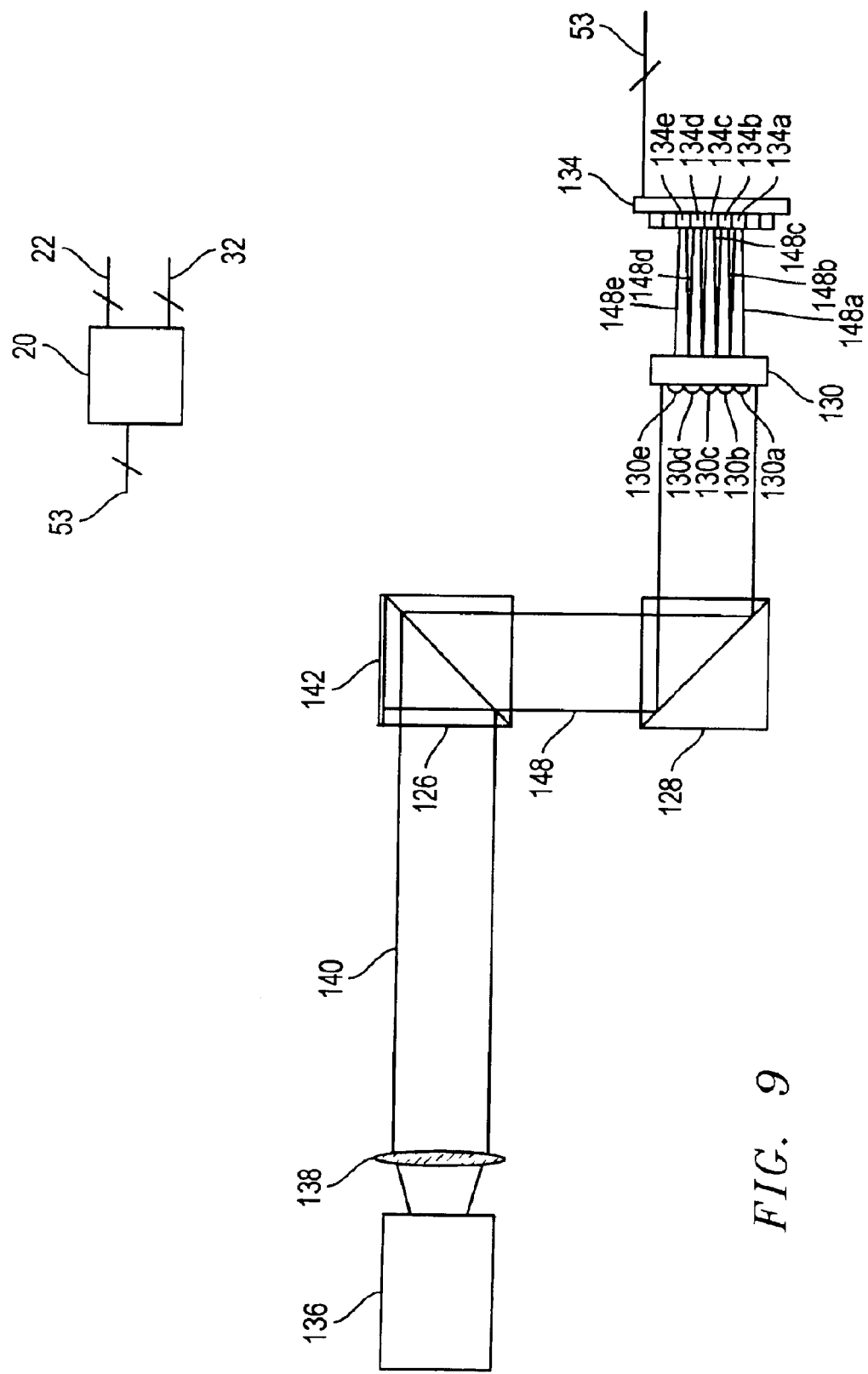
FIG. 9 is a schematic illustration of optical paths of reference light beams in an optical switch in accordance with another embodiment of the present invention.

Referring to FIG. 9, in one embodiment conventional beam splitter 126 reflects about 50% of light beam 140

(formed as described above with reference to FIG. 8) to conventional highly reflective mirror 142, which retroreflects it through beam splitter 126 as light beam 148 incident on conventional 90° prism 128. Mirror 142 is, for example, a conventional highly reflective metal or dielectric coating on a surface of beam splitter 126. Prism 128 reflects light beam 148 to lens array 130, described above with respect to FIG. 7. Lenslets 130a–130e form, respectively, N reference beams 148a–148e and focus them on, respectively, the approximate centers of position sensing detectors 134a–134e. Reference beams 148a–148e have, for example, beam spot diameters of about 0.5 mm at detectors 134a–134e. Position sensing detectors 134a–134e provide electrical signals indicating the (physically stationary) positions of reference light beams 148a–148e to control system 20 via bus 53.

Figure 10:
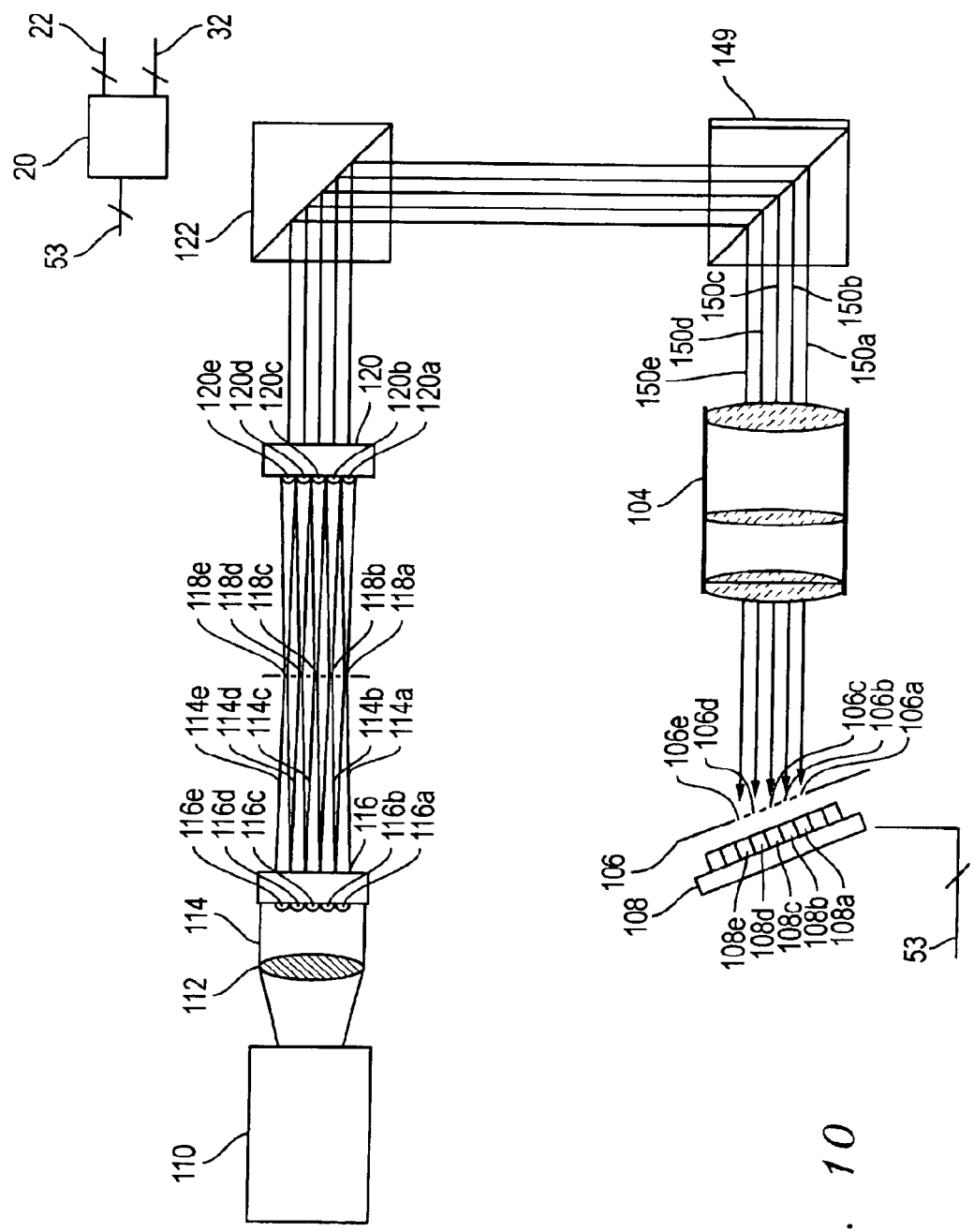
FIG. 10 is a schematic illustration of optical paths of reference light beams in an optical switch in accordance with another embodiment of the present invention.

Referring to FIG. 10, conventional beam splitter 102 reflects about 25% of light beams 114a–114e, formed as described above with reference to FIG. 7, to conventional highly reflective mirror 149. Mirror 149 is, for example, a conventional highly reflective metal or dielectric coating on a surface of beam splitter 102. Mirror 149 retroreflects the portions of light beams 114a–114e incident on it through beam splitter 102 to conventional lens group 104 as reference light beams 150a–150e. Lens group 104 directs reference light beams 150a–150e onto, respectively, apertures 106a–106e of aperture array 106. Lens group 104 and aperture array 106 were described above with reference to FIG. 6. Reference light beams 150a–150e pass through apertures 106a–106e and are incident on, respectively, the approximate centers of position sensing detectors 108a–108e with beam spot diameter of, for example, about 0.5 mm. Position sensing detectors 108a–108e provide electrical signals indicating the (physically stationary) positions of reference light beams 150a–150e to control system 20 via bus 53.

In one embodiment, lasers 82, 110, and 136 each emits pulses of light of about 33 microseconds ($\mu$s) duration at a repetition rate of about 10 kilohertz (kHz). The three trains of light pulses emitted by lasers 82, 110, and 136 are interleaved in time to provide to each of the position sensing detectors an alternating sequence of reference beam and control beam light pulses having a repetition rate of about 10 kHz. Hence, the position sensing detectors each provide an alternating sequence of electrical signals in response to the control and reference light beams at a repetition rate of about 10 kHz. This allows the micro mirrors to be controlled to switch light input through one of input fibers 4a–4e and initially directed to one of output fibers 6a–6e to another of output fibers 6a–6e in less than about 10 milliseconds (ms).

Referring to the timing diagrams of FIG. 11, for example, laser 82, from which are derived control light beams 90a–90e (FIG. 5) and 100a–100e (FIG. 6), emits a first train of light pulses at about 100 $\mu$s intervals. Laser 110, from which are derived control light beams 114a–114e (FIG. 7) and reference light beams 150a–150e (FIG. 10), emits a second train of light pulses displaced in time by about +33 $\mu$s with respect to the first train of light pulses. Laser 136, from which are derived reference light beams 146a–146e (FIG. 8) and 148a–148e (FIG. 9), emits a third train of light pulses displaced in time by about +66 $\mu$s with respect to the first train of pulses.

Figure 15:
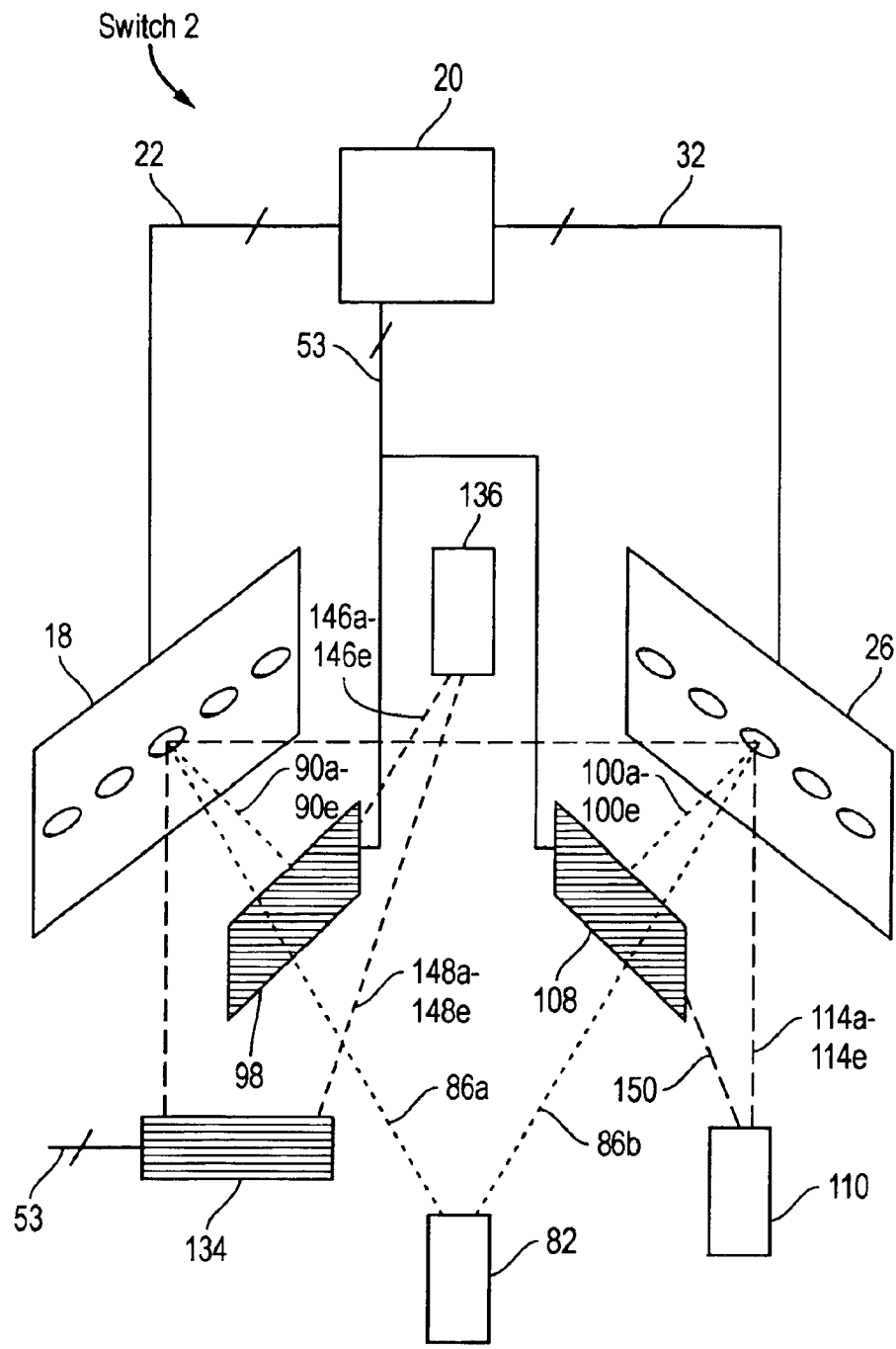
FIG. 15 illustrates, in a block diagram, relationships between mirror arrays, light sources, and position sensing detectors in an optical switch in accordance with an embodiment of the present invention.

The relationships between mirror arrays 18 and 26, position sensing detector arrays 98, 108, and 134, lasers 82, 110, and 136, and control system 20 in embodiments of optical fiber switch 2 are further illustrated in the block diagram of FIG. 15. It should be noted that the various dashed lines representing light beams in FIG. 15 do not indicate detailed optical paths. Each mirror array has associated with it a position sensing detector array and a source of control light beams (e.g., laser 82) which are directed by mirrors in the mirror array to the position sensing detector without being reflected by mirrors in the other array. This arrangement enables coarse control (e.g., resolution better than about 0.04°) of the orientations of the mirrors in each mirror array over large ranges of angles (e.g., greater than about 20°). Although each mirror array in the illustrated embodiments has associated with it a separate position sensing detector for coarse control, a single position sensing detector may be used to detect control beams directed to it by both mirror array 18 and mirror array 26.

Finer resolution control of the orientation of the mirrors (e.g., resolution better than about 0.005°) in the mirror arrays and of the light beams switched by optical fiber switch 2 over narrower ranges of angles is enabled by the use of control beams which are directed by mirrors in one mirror array to mirrors on the other mirror array and thence to a position sensing detector array. In combination, the arrangements for coarse and fine control allow fine control of the mirror orientations over a large range of angles such as, e.g., a resolution of better than about 0.005° over a range of angles greater than about 20°.

In the illustrated embodiments control light is directed to the mirror arrays through dichroic beam splitter 24 (FIGS. 1, 5, and 6) located between the mirror arrays in an optical path of the, e.g., telecommunication light beams to be directed from input ports to output ports. The mirrors in the mirror arrays direct the control beams to position sensing detector arrays via dichroic beam splitters 42 and 54 (FIGS. 1, 5, and 6). In other embodiments however, control light may be directed to the mirror arrays via dichroic beam splitters positioned similarly to dichroic beam splitters 42 and 54. Also, the mirrors in the mirror arrays may direct control beams to position sensing detectors through a dichroic beam splitter positioned similarly to dichroic beam splitter 24.

The illustrated embodiments employ three lasers as sources of control and reference light beams. Other embodiments may employ more or fewer than three light sources to provide control and reference light beams. Moreover, control and reference light beams provided by the same light source in the illustrated embodiments may be provided by different light sources in other embodiments.

Figure 12:
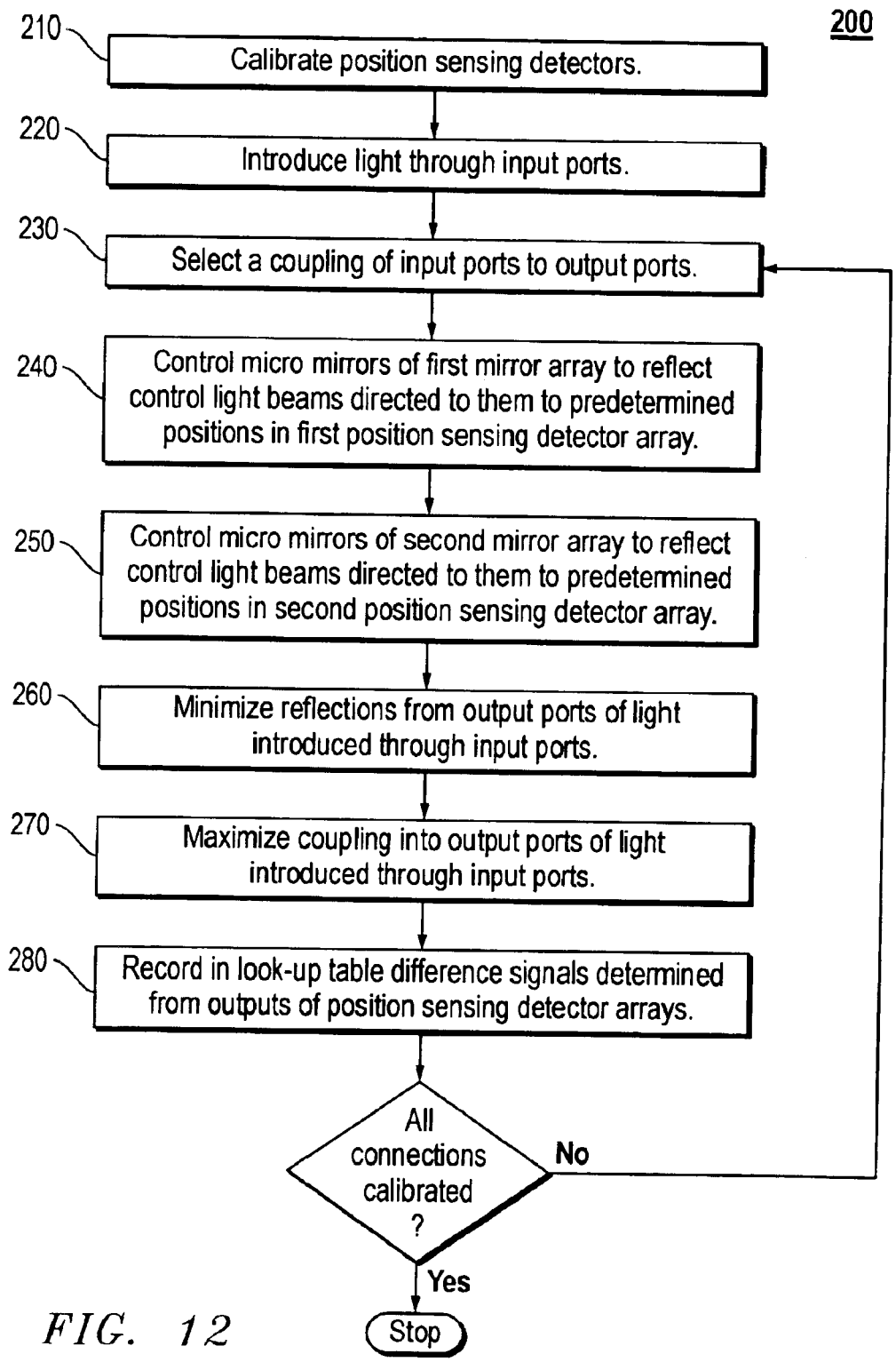
FIG. 12 illustrates, in a flow chart, a method of calibrating and aligning an optical switch in accordance with an embodiment of the present invention.

An optical fiber switch in accordance with an embodiment of the present invention may be initially aligned with method 200 outlined in the flowchart of FIG. 12. In step 210, the position sensing detectors are calibrated prior to their installation in the optical fiber switch. Collimated light beams having wavelengths, intensities, and diameters similar to those of the control and reference beams described above are directed onto the position sensing detectors. The electrical signals produced in response by the detectors and the locations at which the light beams are incident on the detectors (independently measured with a microscope, for example) are recorded in a calibration look-up table. The calibration look-up table is stored, for example, in control system 20. This process is repeated about N×P times (where N and P are the number of micro mirrors in micro mirror arrays 18 and 26, respectively), with the light beams incident at different locations on the detectors each time.

It should be noted that calibration look-up tables prepared in step 210 are substantially identical for substantially identical arrays of position sensing detectors. Hence, it is not necessary to prepare separate look-up tables for each of position sensing detector arrays 98, 108, and 134 if the detector arrays are substantially identical. Moreover, the calibration look-up table may be prepared from measurements made with a position sensing detector array (or averaged measurements made with several position sensing detector arrays) other than those included in optical switch 2.

After the position sensing detectors are calibrated, in step 220 infrared light having a wavelength used in telecommunications, for example, is introduced to optical switch 2 through input optical fibers 4a–4e to form light beams 16a–16e incident on micro mirrors 18a–18e (FIG. 1). Next, in step 230, a switch configuration is selected corresponding to a desired coupling of input optical fibers 4a–4e to output optical fibers 6a–6e.

After step 230, in step 240 control system 20 approximately aligns micro mirrors 18a–18e to direct light beams 16a–16e to the particular ones of micro mirrors 26a–26e consistent with the selected switch configuration. Control system 20 accomplishes this by using the information in the calibration look-up table to control micro mirrors 18a–18e to direct control light beams 90a–90e to predetermined positions on position sensing detectors 98a–98e corresponding to the required orientations of micro mirrors 18a–18e (FIG. 5). The orientations of micro mirrors 18a–18e required to direct light beams 16a–16e to particular ones of micro mirrors 26a–26e can be calculated from the known geometry of optical switch 2.

Next, in step 250 control system 20 approximately aligns micro mirrors 26a–26e to direct whichever ones of light beams 16a–16e are incident on them to, respectively, lenslets 34a–34e and thus approximately to fiber ends 40a–40e (FIG. 1). Control system 20 accomplishes this by using the information in the calibration look-up table to control micro mirrors 26a–26e to direct control light beams 100a–100e to positions on position sensing detectors 108a–108e corresponding to the required orientations of micro mirrors 26a–26e (FIG. 6). The required orientations of micro mirrors 26a–26e can be calculated from the known geometry of optical switch 2 and the known orientations of micro mirrors 18a–18e.

Typically, each of control light beams 114a–114e will be incident on a corresponding one of position sensing detectors 134a–134e after step 250 is performed (FIG. 7). Light beams 16a–16e may be sufficiently misaligned, however, that lenslets 34a–34e do not necessarily focus the particular ones of light beams 16a–16e incident on them onto, respectively, the cores of fiber ends 40a–40e.

After step 250, in step 260 control system 20 controls micro mirrors 26a–26e or micro mirrors 18a–18e to minimize the intensity of light beams 56a–56e reflected, respectively, by fiber ends 40a–40e or neighboring regions of fiber block 38 and detected by output sensor 64 (FIG. 3). The minimum intensity reflections may be found, for example, by raster scanning light beams 16a–16e across the particular fiber ends to which they were approximately directed in step 250. As a result of this minimization process, light beams 16a–16e are focused onto the cores of the fiber ends upon which they are incident. Thus, after step 260 at least a portion of the light in each of light beams 16a–16e is coupled into the particular one of output optical fibers 6a–6e to which it is directed.

Next, in step 270 control system 20 fine-tunes the alignment of light beams 16a–16e by varying the orientations of micro mirrors 18a–18e and 26a–26e to maximize the intensity of the light coupled into optical fibers 6a–6e. For example, the intensity of light coupled into output optical fiber 6a may be maximized by iteratively varying the orientation of micro mirror 26a and the orientation of the one of micro mirrors 18a–18e from which the light beam incident on fiber 6a is reflected. The intensity of the light coupled into the output optical fibers may be measured, for example, with conventional InGaAs photodiodes temporarily optically coupled to the output optical fibers. As a result of this maximization process, light beams 16a–16e are approximately centered on the micro mirrors by which they are reflected and approximately centered on the cores of the output fibers upon which they are focused.

Next, in step 280 control system 20 calculates and records, in an alignment look-up table, differences between the electrical signals provided by position sensing detectors 98a–98e, 108a–108e, and 134a–134e in response to the control and reference light beams. These difference signals represent positions on the position sensing detectors and correspond to the optimal alignment of light beams 16a–16e. After step 280, at step 290 control system 20 determines whether steps 240 through 280 have been performed for all possible connections of input ports to output ports. If not, control system 20 returns to step 230.

Method 200 is one of several methods by which an optical fiber switch in accordance with an embodiment of the present invention may be initially aligned and calibrated. Other suitable methods that may be used in addition to or in place of method 200 are described in U.S. patent application Ser. No. 09/999,705.

Figure 13:
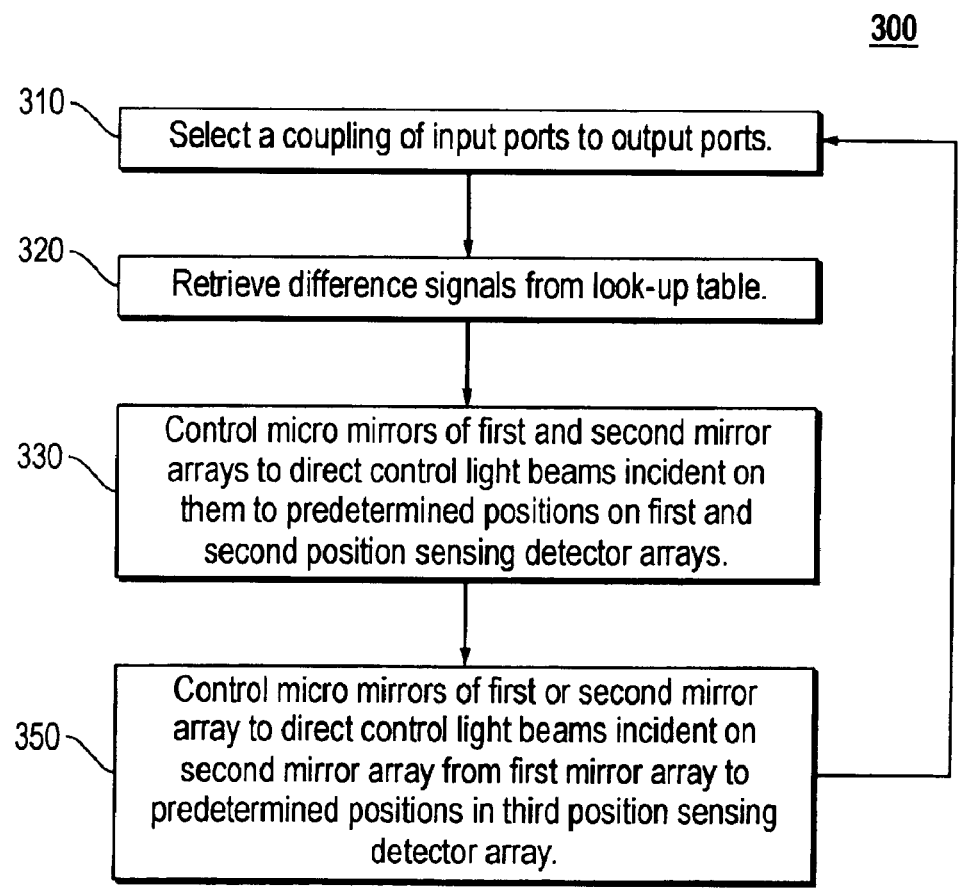
FIG. 13 illustrates, in a flow chart, a method of operating an optical switch in accordance with an embodiment of the present invention.

After initial calibration and alignment, control system 20 may operate an optical switch in accordance with an embodiment of the present invention with operation method 300 outlined in the flowchart of FIG. 13. In step 310, control system 20 selects a switch configuration corresponding to a desired coupling of input optical fibers 4a–4e to output optical fibers 6a–6e. Next, in step 320, control system 20 retrieves from the alignment look-up table the difference signals (positions on the position sensing detectors) corresponding to the optimized alignment of the selected switch configuration.

After step 320, in step 330 control system 20 aligns micro mirrors 18a–18e to direct control light beams 90a–90e to predetermined positions on position sensing detectors 98a–98e corresponding to the selected switch configuration. Control system 20 accomplishes this, for example, by controlling micro mirrors 18a–18e such that differences between the electrical signals provided by detectors 98a–98e in response to control and reference light beams reproduce difference signals retrieved in step 320. Control system 20 also aligns micro mirrors 26a–26e to direct control light beams 100a–100e to predetermined positions on position sensing detectors 108a–108e corresponding to the selected switch configuration. Control system 20 accomplishes this, for example, by controlling micro mirrors 26a–26e such that differences between the electrical signals provided by detectors 108a–108e in response to control and reference light beams reproduce difference signals retrieved in step 320.

Next, in step 350 control system 20 aligns either micro mirrors 18a–18e or micro mirrors 26a–26e to direct control light beams 114a–114e to predetermined positions on position sensing detectors 134a–134e corresponding to the selected switch configuration. Control system 20 accomplishes this, for example, by controlling micro mirrors 18a–18e or micro mirrors 26a–26e such that differences between the electrical signals provided by detectors 134a–134e in response to control and reference light beams reproduce difference signals retrieved in step 320. From step 350, control system 20 returns to step 310.

Method 300 does not require the presence of light beams 16a–16e in optical switch 2. Thus, control system 20 can confirm that micro mirrors 18a–18e and 26a–26e are aligned to couple light output by a particular one of input optical fibers 4a–4e into a particular one of output optical fibers 6a–6e even if the particular input optical fiber is not carrying light. That is, control system 20 can provide dark fiber confirmation. In one embodiment after step 350 control system 20 sends a signal to a network node controller, for example, indicating that a particular connection between an input port and an output port has been established. This signal may be sent before light is introduced into the input port.

Figure 14:
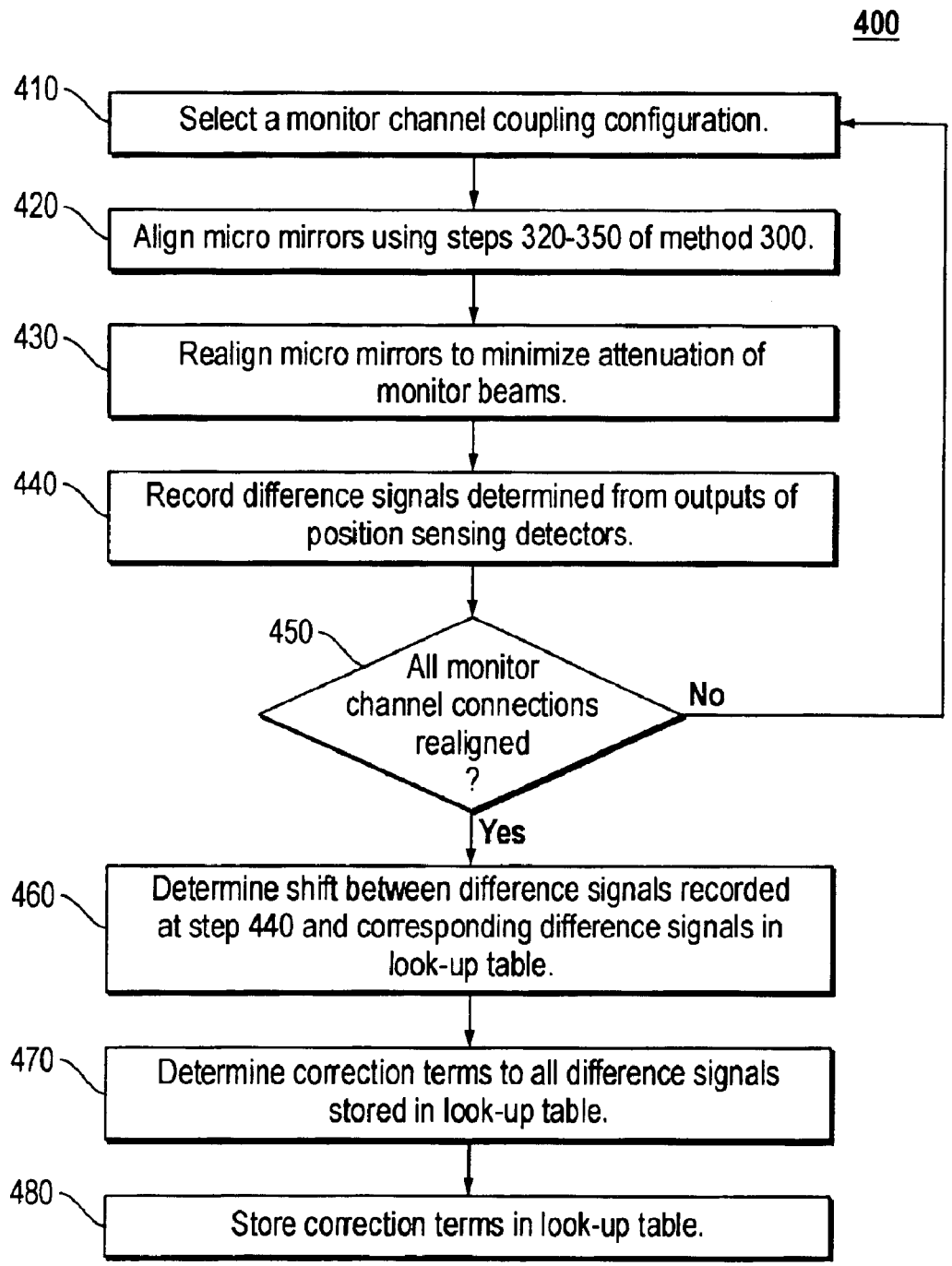
FIG. 14 illustrates, in a flow chart, a method for recalibrating an optical switch in accordance with an embodiment of the present invention.

The relative positions of the various optical elements in optical switch 2 may vary with time. Such variations may be due, for example, to expansion or contraction caused by changes in temperature or to vibrations. Thus, occasionally it may be advantageous to realign and recalibrate optical switch 2. Optical switch 2 may be realigned and recalibrated with recalibration method 400 outlined in the flowchart of FIG. 14. In step 410 control system 20 selects a switch configuration corresponding to a desired coupling of monitor channels 4a and 4e to monitor channels 6a and 6e (FIG. 4). Next, in step 420 control system 20 executes the steps of method 300 to make the selected connections between monitor channels.

Next, in step 430 control system 20 fine-tunes the alignment of monitor beams 16a and 16e by varying the orientations of micro mirrors 18a, 18e, 26a, and 26e to minimize the attenuation of the monitor beams during their passage through optical switch 2. After step 430, in step 440 control system 20 calculates and stores differences between the electrical signals provided by position sensing detectors 98a, 98e, 108a, 108e, 134a, and 134e in response to control and reference beams. These difference signals represent positions on the position sensing detectors and correspond to the reoptimized alignment of monitor light beams 16a and 16e.

Next, in step 450 control system 20 determines whether steps 420 through 440 have been performed for all monitor channel coupling connections. If not, control system 20 returns to step 410.

If steps 420 through 440 have been performed for all monitor channel connections, then in step 460 control system 20 determines a systematic shift between the difference signals stored at step 440 and the corresponding difference signals stored in the alignment look-up table during initial alignment and calibration (e.g., factory calibration) of the optical switch. Next, in step 470 control system 20 calculates correction terms to all of the difference signals stored during the initial alignment and calibration of the optical switch from the shift determined in step 460. Difference signals to be used by control system 20 when executing method 300 are combinations of these correction terms with difference signals stored during initial alignment and calibration of the optical switch. Next, in step 480 control system 20 stores the correction terms in the alignment look-up table.

Variations of and more detailed implementations of method 400 are described in U.S. patent application Ser. No. 09/999,705.

An optical fiber switch 2 in accordance with an embodiment of the present invention typically operates with an insertion loss of less than about 3 decibels. That is, the power in an optical signal carried by one of input optical fibers 4a–4e is typically attenuated by less than about 3 decibels during passage through optical fiber switch 2 into one of output optical fibers 6a–6e. This low insertion loss results in part because the orientations of micro mirrors 18a–18e and 26a–26e can be measured and controlled without sampling the light carried by the input optical fibers. In addition, the precision with which the alignments of light beams 16a–16e are controlled results in efficient coupling of the light beams into the output optical fibers. Moreover, optical fiber switch 2 may be physically compact. Consequently, the optical paths of light beams 16a–16e through optical fiber switch 2 are typically less than about 360 mm in length. Hence, the diameters of light beams 16a–16e remain small and losses due to diffraction are thus low.

While the present invention is illustrated with particular embodiments, the invention is intended to include all variations and modifications falling within the scope of the appended claims.

We claim:

1. An optical switch comprising:
   a first plurality of ports;
   a second plurality of ports;
   a first plurality of mirrors disposed on a first surface;
   a second plurality of mirrors disposed on a second surface; and
   a dichroic optical element positioned between the first plurality of mirrors and the second plurality of mirrors to reflect a monitor light beam from the first plurality of mirrors to the second plurality of mirrors;
   wherein each one of said first plurality of mirrors is individually controllable to direct light output from a corresponding one of said first plurality of ports to any one of said second plurality of mirrors via said dichroic optical element; and
   wherein each one of said second plurality of mirrors is individually controllable to direct to a corresponding one of said second plurality of ports light incident on said one of said second plurality of mirrors from any one of said first plurality of mirrors.

2. The optical switch of claim 1, wherein said first plurality of ports and said second plurality of ports each includes greater than about 1000 ports.

3. The optical switch of claim 1, wherein said first plurality of mirrors and said second plurality of mirrors each includes greater than about 1000 mirrors.

4. The optical switch of claim 1, wherein each of said first plurality of mirrors and each of said second plurality of mirrors has an orientation controllable with an angular resolution better than about 0.005°.

5. The optical switch of claim 1, wherein said first plurality of ports, said second plurality of ports, said first plurality of mirrors, and said second plurality of mirrors are symmetrically located with respect to said dichroic optical element.

6. The optical switch of claim 1, wherein said dichroic optical element is a dichroic beam splitter.

7. The optical switch of claim 1, wherein light output by one of said first plurality of ports is focused to a waist between said first plurality of mirrors and said second plurality of mirrors.

8. The optical switch of claim 1, wherein light output by one of said first plurality of ports is incident on one of said first plurality of mirrors at an angle less than about 25° with respect to an axis normal to said first surface.

9. The optical switch of claim 1, further comprising a beam splitter located in an optical path between said first plurality of ports and said first plurality of mirrors.

10. The optical switch of claim 1, further comprising a dichroic optical element located in an optical path between said first plurality of ports and said first plurality of mirrors.

11. The optical switch of claim 1 wherein the optical switch operates with an insertion loss of less than about 3 decibels.

12. An optical switch comprising:
a first plurality of ports;
a second plurality of ports;
a first plurality of mirrors disposed on a first surface;
a second plurality of mirrors disposed on a second surface;
a dichroic optical element located in an optical path between said first plurality of ports and said first plurality of mirrors; and
a reflective structure optically coupled between the dichroic optical element and a sensor to reflect an optical beam from the dichroic optical element to the sensor;
wherein each one of said first plurality of mirrors is individually controllable to direct light output from a corresponding one of said first plurality of ports to any one of said second plurality of mirrors; and
wherein each one of said second plurality of mirrors is individually controllable to direct to a corresponding one of said second plurality of ports light incident on said one of said second plurality of mirrors from any one of said first plurality of mirrors.

13. The optical claim 12, wherein said first plurality of ports and said second plurality of ports each includes greater than about 1000 ports.

14. The optical switch of claim 12, wherein said first plurality of mirrors and said second plurality of mirrors each includes greater than about 1000 mirrors.

15. The optical switch of claim 12, wherein each of said first plurality of mirrors and each of said second plurality of mirrors has an orientation controllable with an angular resolution greater than about 0.005°.

16. The optical switch of claim 12, wherein said first plurality of ports, said second plurality of ports, said first plurality of mirrors, and said second plurality of mirrors are arranged symmetrically.

17. The optical switch of claim 12, wherein said dichroic optical element is a dichroic beam splitter.

18. The optical switch of claim 12, wherein light output by one of said first plurality of ports is focused to a waist between said first plurality of mirrors and said second plurality of mirrors.

19. The optical switch of claim 12, wherein light output by one of said first plurality of ports is incident on one of said first plurality of mirrors at an angle less than about 25° with respect to an axis normal to said first surface.

20. The optical switch of claim 12, further comprising a dichroic optical element located in an optical path between said second plurality of ports and said second plurality of mirrors.

21. The optical switch of claim 12 wherein the optical switch operates with an insertion loss of less than about 3 decibels.

22. The optical switch of claim 12 wherein the maximum angle by which any one mirror of the first plurality of mirrors may be tilted to direct light from the first plurality of ports to any one of the second plurality of mirrors is less than about 10 degrees.

23. An optical switch comprising:
a first plurality of ports;
a second plurality of ports;
a first plurality of mirrors disposed on a first surface;
a second plurality of mirrors disposed on a second surface;
a beam splitter located in an optical path between said first plurality of ports and said first plurality of mirrors; and
a reflective structure optically coupled between the beam splitter and a field lens to reflect an optical beam from the beam splitter to the field lens;
wherein each one of said first plurality of mirrors is individually controllable to direct light output from a corresponding one of said first plurality of ports to any one of said second plurality of mirrors; and
wherein each one of said second plurality of mirrors is individually controllable to direct to a corresponding one of said second plurality of ports light incident on said one of said second plurality of mirrors from any one of said first plurality of mirrors.

24. The optical switch of claim 23, wherein said first plurality of ports and said second plurality of ports each includes greater than about 1000 ports.

25. The optical switch of claim 23, wherein said first plurality of mirrors and said second plurality of mirrors each includes greater than about 1000 mirrors.

26. The optical switch of claim 23, wherein each of said first plurality of mirrors and each of said second plurality of mirrors has an orientation controllable with an angular resolution greater than about 0.005°.

27. The optical switch of claim 23, wherein said first plurality of ports, said second plurality of ports, said first plurality of mirrors, and said second plurality of mirrors are arranged symmetrically.

28. The optical switch of claim 23, wherein light output by one of said first plurality of ports is focused to a waist between said first plurality of mirrors and said second plurality of mirrors.

29. The optical switch of claim 23 wherein the optical switch operates with an insertion loss of less than about 3 decibels.

30. The optical switch of claim 23, further comprising a beam splitter located in an optical path between said second plurality of ports and said second plurality of mirrors.

31. The optical switch of claim 23 wherein light output by one of said first plurality of ports is incident on one of said first plurality of mirrors at an angle less than about 25° with respect to an axis normal to said first surface.

32. An optical switch comprising:
a first plurality of ports;
a second plurality of ports;
a first plurality of mirrors disposed on a first surface; and
a second plurality of mirrors disposed on a second surface, wherein the first plurality of mirrors and the second plurality of mirrors are disposed to reflect a monitor light beam from the first plurality of ports to the second plurality of ports;
wherein each one of said first plurality of mirrors is individually controllable to direct light output form a corresponding one of said first plurality of ports to any one of said second plurality of mirrors; and
wherein each one of the second plurality of mirrors is individually controllable to direct to a corresponding one of said second plurality of ports light incident on said one of said second plurality of mirrors from any one of said first plurality of mirrors, further comprising;
a first dichroic optical element located in an optical path between said first plurality of ports and said first plurality of mirrors;

a first reflective structure optically coupled between the first dichroic optical element and a first sensor to reflect a first optical beam from the first dichroic optical element to the first sensor;

a second dichroic optical element located in an optical path between said second plurality of ports and said second plurality of mirrors; and a second reflective structure optically coupled between the second dichroic optical element and a second sensor to reflect a second optical beam from the second dichroic optical element to the second sensor; and a control system to control and monitor the orientation of each mirror of said first and second plurality of mirrors based on light intensity detected at the first and second sensors.

33. The optical switch of claim 32 wherein said first plurality of ports and said second plurality of ports each includes greater than about 1000 ports, and wherein said first plurality of mirrors and said second plurality of mirrors each includes greater than about 1000 mirrors.

34. The optical switch of claim 32 wherein the optical switch operates with an insertion loss of less than about 3 decibels.

35. The optical switch of claim 32 wherein light output by one of said first plurality of ports is incident on one of said first plurality of mirrors at an angle less than about 25° with respect to an axis normal to said first surface.

36. The optical switch of claim 32 wherein each of said first plurality of mirrors and each of said second plurality of mirrors has an orientation controllable with an angular resolution better than about 0.005°.

* * * * *